(12) United States Patent
Qiu et al.

(10) Patent No.: US 11,442,550 B2
(45) Date of Patent: Sep. 13, 2022

(54) METHODS FOR GESTURE RECOGNITION AND CONTROL

(71) Applicant: Samsung Electronics Co., Ltd., Suwon-si (KR)

(72) Inventors: Wenxun Qiu, Allen, TX (US); Boon Loong Ng, Plano, TX (US); Han Wang, Plano, TX (US); Khuong N. Nguyen, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/847,468

(22) Filed: Apr. 13, 2020

(65) Prior Publication Data
US 2020/0356178 A1 Nov. 12, 2020

Related U.S. Application Data

(60) Provisional application No. 62/868,431, filed on Jun. 28, 2019, provisional application No. 62/843,857, filed on May 6, 2019.

(51) Int. Cl.
*G06F 3/01* (2006.01)
*G01S 13/88* (2006.01)
(Continued)

(52) U.S. Cl.
CPC .............. *G06F 3/017* (2013.01); *G01S 7/415* (2013.01); *G01S 13/581* (2013.01); *G01S 13/88* (2013.01); *G06F 3/046* (2013.01)

(58) Field of Classification Search
CPC ........ G06F 3/017; G06F 3/046; G01S 13/581; G01S 7/415; G01S 13/88; G01S 7/417; G01S 7/003
See application file for complete search history.

(56) References Cited

U.S. PATENT DOCUMENTS 8,436,821 B1 * 5/2013 Plichta ................ G06F 3/04883
345/173
8,582,037 B2 * 11/2013 Stern ...................... G06F 3/017
348/734
(Continued)

FOREIGN PATENT DOCUMENTS

CN 107526437 A * 12/2017
CN 105573498 B * 5/2018
(Continued)

OTHER PUBLICATIONS

Le Yang; Gang Li. Sparsity aware dynamic gesture recognition using radar sensors with angular diversity, Oct. 2018, 2 pages (Year: 2018).*
(Continued)

*Primary Examiner* — Yongjia Pan

(57) ABSTRACT

An electronic device and a method for gesture recognition are disclosed. The electronic device includes a radar transceiver and a processor operably connected to the radar transceiver. The processor is configured to detect a triggering event. In response to detecting the triggering event, the processor is configured to transmit, via the radar transceiver, radar signals. The processor is also configured to identify a gesture from reflections of the radar signals received by the radar transceiver. The processor is further configured to determine whether the gesture is associated with the triggering event. Based on determining that the gesture is associated with the triggering event, the processor is configured to perform an action indicated by the gesture.

20 Claims, 21 Drawing Sheets

(51) Int. Cl.
  *G01S 13/58* (2006.01)
  *G06F 3/046* (2006.01)
  *G01S 7/41* (2006.01)

(56) References Cited

U.S. PATENT DOCUMENTS

| | | | |
|---|---|---|---|
| 9,069,067 B2* | 6/2015 | Bangera | G01S 13/0209 |
| 9,235,241 B2* | 1/2016 | Newham | G06F 3/017 |
| 9,335,825 B2* | 5/2016 | Rautiainen | G01S 13/88 |
| 9,600,080 B2* | 3/2017 | Poupyrev | G01S 13/72 |
| 9,811,164 B2* | 11/2017 | Poupyrev | G01S 7/415 |
| 9,921,657 B2* | 3/2018 | Sprenger | G06F 3/017 |
| 9,921,660 B2* | 3/2018 | Poupyrev | G06F 3/017 |
| 9,971,414 B2* | 5/2018 | Gollakota | G06F 13/28 |
| 10,137,363 B2* | 11/2018 | Parshionikar | G06F 3/017 |
| 10,139,916 B2* | 11/2018 | Poupyrev | G01S 7/415 |
| 10,466,772 B2* | 11/2019 | Trotta | B60R 25/245 |
| 10,481,696 B2* | 11/2019 | Molchanov | G06N 3/082 |
| 10,579,154 B1* | 3/2020 | Lien | G01S 7/352 |
| 10,684,693 B2* | 6/2020 | Kletsov | G01S 7/2925 |
| 10,817,065 B1* | 10/2020 | Lien | G06F 16/245 |
| 2006/0013440 A1* | 1/2006 | Cohen | G06K 9/00355 382/103 |
| 2010/0202656 A1* | 8/2010 | Ramakrishnan | G06K 9/6278 382/103 |
| 2011/0173574 A1* | 7/2011 | Clavin | G06F 3/017 715/863 |
| 2011/0181509 A1* | 7/2011 | Rautiainen | G06F 3/017 345/158 |
| 2011/0221666 A1* | 9/2011 | Newton | G06F 3/04883 345/156 |
| 2011/0221974 A1* | 9/2011 | Stern | G06T 7/66 348/734 |
| 2012/0133579 A1* | 5/2012 | Prieur | G06F 3/017 345/156 |
| 2013/0154919 A1* | 6/2013 | Tan | G06F 3/03 345/156 |
| 2013/0162514 A1* | 6/2013 | Zawacki | G06F 1/3206 345/156 |
| 2014/0282274 A1* | 9/2014 | Everitt | G06F 3/017 715/863 |
| 2015/0084859 A1* | 3/2015 | Itzhaik | G06K 9/00355 345/156 |
| 2015/0277569 A1 | 10/2015 | Sprenger et al. | |
| 2015/0277848 A1* | 10/2015 | Grothe | G06F 3/162 340/4.42 |
| 2016/0055201 A1* | 2/2016 | Poupyrev | G06F 3/017 707/722 |
| 2016/0252607 A1* | 9/2016 | Saboo | G06F 3/017 342/107 |
| 2016/0259037 A1* | 9/2016 | Molchanov | G06K 9/78 |
| 2016/0320853 A1* | 11/2016 | Lien | G06F 3/017 |
| 2016/0320854 A1* | 11/2016 | Lien | G01S 7/354 |
| 2017/0090583 A1* | 3/2017 | Zamora Esquivel | G06F 3/014 |
| 2018/0011544 A1* | 1/2018 | Franklin | H04N 21/42204 |
| 2018/0046255 A1* | 2/2018 | Rothera | G06K 9/00335 |
| 2018/0101239 A1* | 4/2018 | Yin | G06F 3/011 |
| 2018/0157330 A1* | 6/2018 | Gu | G06F 3/017 |
| 2018/0196527 A1 | 7/2018 | Poupyrev et al. | |
| 2018/0224980 A1* | 8/2018 | Avila | G06K 9/00355 |
| 2018/0329049 A1* | 11/2018 | Amihood | G01S 13/04 |
| 2019/0011989 A1 | 1/2019 | Schwesig et al. | |
| 2019/0302895 A1* | 10/2019 | Jiang | G06K 9/00389 |
| 2019/0346929 A1* | 11/2019 | Misra | G06F 3/167 |
| 2019/0384409 A1* | 12/2019 | Omer | G01S 7/006 |
| 2020/0026361 A1* | 1/2020 | Baheti | G01S 13/06 |
| 2020/0064458 A1* | 2/2020 | Giusti | G01S 7/02 |
| 2020/0066236 A1* | 2/2020 | Giusti | G01S 7/415 |
| 2020/0319302 A1* | 10/2020 | Nanzer | G01S 13/4454 |
| 2021/0232235 A1* | 7/2021 | Regani | H04W 4/029 |

FOREIGN PATENT DOCUMENTS

| | | | | |
|---|---|---|---|---|
| CN | 108344995 A | * | 7/2018 | G06F 3/017 |
| CN | 105447506 B | * | 4/2019 | |
| CN | 111880650 A | * | 11/2020 | G06F 3/017 |
| KR | 20170007472 A | * | 1/2017 | G01S 13/72 |
| KR | 20210037759 A | * | 4/2021 | G06F 3/017 |
| WO | WO-2019005936 A1 | * | 1/2019 | G01S 13/42 |

OTHER PUBLICATIONS

Shimeng Zhang; Gang Li; Ritchie, Matthew; Fioranelli, Francesco; Griffiths, Hugh. Dynamic hand gesture classification based on radar micro-Doppler signatures, 2016, 2 pages (Year: 2016).*

Souvik Hazra, Avik Santra, Robust Gesture Recognition Using Millimetric-Wave Radar System, Nov. 21, 2018, 4 pages (Year: 2018).*

Pavlo Molchanov, Shalini Gupta, Kihwan Kim, Kari Pulli, Short-range FMCW monopulse radar for hand-gesture sensing, May 10-15, 2015, 6 pages (Year: 2015).*

Efe Öztürk,Dieter Genschow,Uroschanit Yodprasit,Berk Yilmaz,Dietmar Kissinger,Wojciech Debski,Wolfgang Winkler, A 60-GHz SiGe BiCMOS Monostatic Transceiver for FMCW Radar Applications, Dec. 12, 2017, 15 pages (Year: 2017).*

Zhenyuan Zhang,Zengshan Tian,Mu Zhou,Wei Nie,Ze Li, Riddle: Real-Time Interacting with Hand Description via Millimeter-Wave Sensor, Jul. 31, 2018, 7 pages (Year: 2018).*

International Search Report of the International Searching Authority in connection with International Patent Application No. PCT/KR2020/005846 dated Aug. 7, 2020, 4 pages.

S. Björklund, et al., "Evaluation of a Micro-Doppler Classification Method on mm-Wave Data," IEEE Radar Conference, pp. 934-939, May 2012, Atlanta—6 Pages.

Liu, Weiyang, et al. "SphereFace: Deep Hypersphere Embedding for Face Recognition." Proceedings of the IEEE conference on computer vision and pattern recognition 2017—9 pages.

* cited by examiner

METHODS FOR GESTURE RECOGNITION AND CONTROL

CROSS-REFERENCE TO RELATED APPLICATION AND CLAIM OF PRIORITY

This application claims priority under 35 U.S.C. § 119(e) to U.S. Provisional Patent Application No. 62/843,857 filed on May 6, 2019 and U.S. Provisional Patent Application No. 62/868,431 filed on Jun. 28, 2019. The above-identified provisional patent applications are hereby incorporated by reference in its entirety.

TECHNICAL FIELD

This disclosure relates generally to electronic devices. More specifically, this disclosure relates to radar based gesture recognition for controlling an electronic device.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing. For example, certain electronic devices not only provide voice call services using a mobile communication network, but can also offer video call services, messaging services, data transmission service, multimedia services, and the like.

With the rise of mobile computing technology, a user can interact with various types of information and content of an electronic device. Methods for interacting with and controlling computing devices are continually improving in order to conform to more natural approaches. Computing devices, such as personal computers, smart phones, tablets, head mounted displays and the like, utilize graphical user interfaces (GUI) on a display screen to facilitate control by a user. Objects such as text, images, and video are displayed on a screen and the user can employ various instruments to control the computing device such as, a keyboard, a mouse, a touchpad. Many such methods for interacting with and controlling a computing device generally require a user to physically touch the screen or utilizing an instrument such as a keyboard or mouse to provide a quick and precise input. Touching the screen or using particular instrument to interact with an electronic device can be cumbersome.

SUMMARY

This disclosure provides methods for gesture recognition and control.

In one embodiment an electronic device for gesture recognition is provided. The electronic device includes a radar transceiver and a processor. The processor is configured to detect a triggering event. In response to detecting the triggering event, the processor is configured to transmit radar signals, via the radar transceiver. The processor is also configured to identify a gesture from reflections of the radar signals received by the radar transceiver. The processor is further configured to determine whether the gesture is associated with the triggering event. Based on determining that the gesture is associated with the triggering event, the processor is configured to perform an action indicated by the gesture In another embodiment, a method for gesture recognition is provided. The method comprises detecting a triggering event. In response to detecting the triggering event, the method comprises transmitting radar signals, via a radar transceiver. The method also comprises identifying a gesture from reflections of the radar signals received by the radar transceiver. The method further comprises determining whether the gesture is associated with the triggering event. Based on determining that the gesture is associated with the triggering event, the method comprises performing an action indicated by the gesture.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
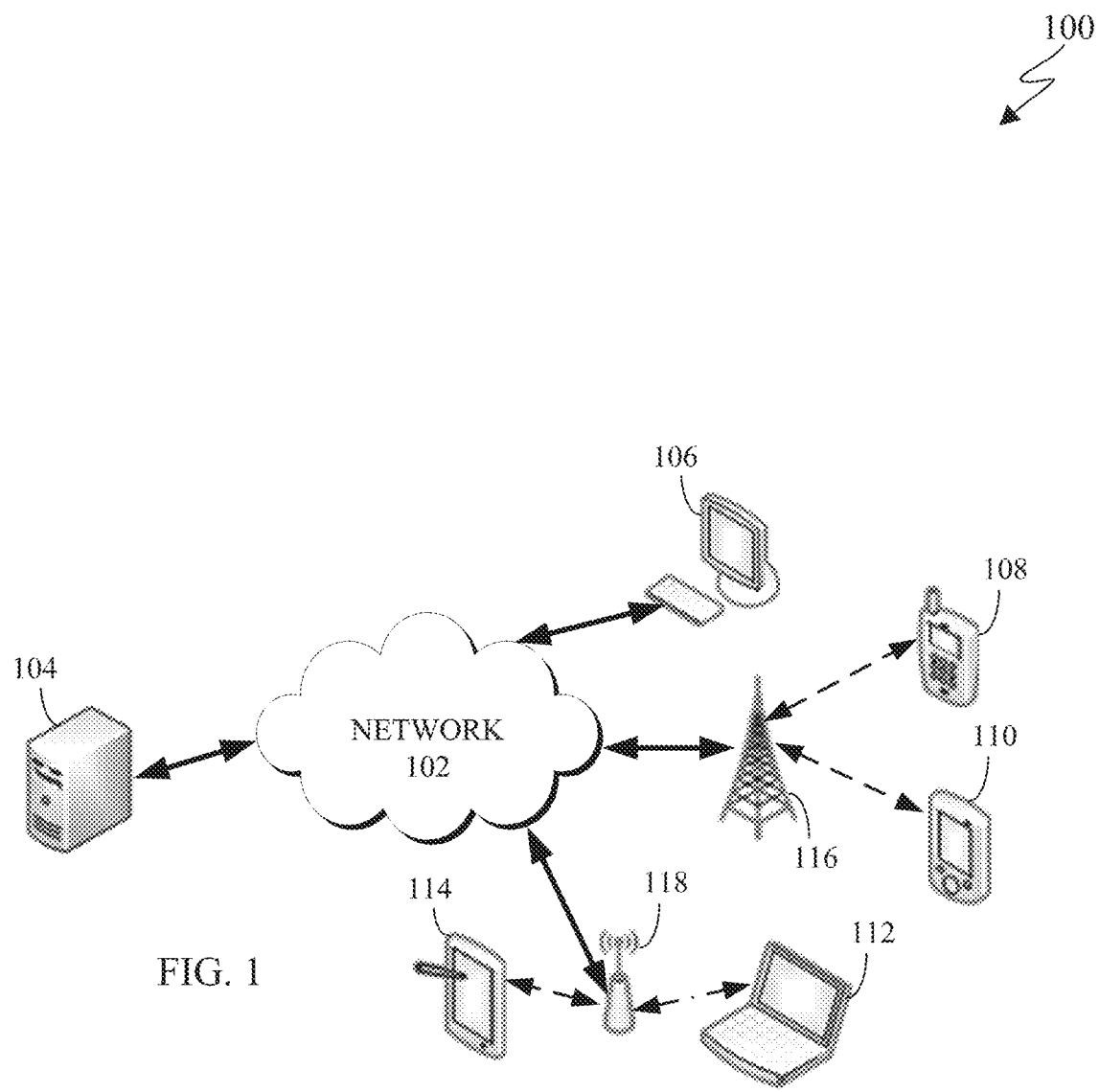
FIG. 1 illustrates an example communication system according to embodiments of this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of the present disclosure, can include personal computers (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), portable multimedia players (PMPs), MP3 players, mobile medical devices, virtual reality headsets, portable game consoles, cameras, and wearable devices, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices, and can include new electronic devices depending on the development of technology. It is noted that as used herein, the term "user" may denote a human or another device (such as an artificial intelligent electronic device) using the electronic device.

Certain electronic devices include a graphical user interface (GUI) such as a display that allows a user to view information displayed on the display in order to interact with the electronic device. Electronic devices can also include a user input device, such as keyboard, a mouse, a touchpad, a camera, among others. The various types of input devices allow a user to interact with the electronic device. The input devices can be operably connected to the electronic device via a wired or wireless connection. Certain electronic devices can also include a combination of a user input device and a GUI, such as a touch screen. Touch screens allow a user to interact with the electronic device via touching the display screen itself.

Embodiments of the present disclosure recognize and take into consideration that, input devices can be cumbersome to use on portable electronic devices since the input devices would need to be carried along with the portable electronic device. Additionally, embodiments of the present disclosure recognize and take into consideration that, the user may be unable to directly touch a touch screen or when the user is unable to reach the electronic device. For example, when the user is wearing gloves, the touch screen may have difficulty detecting the touch input. Similarly, the user may not desire to touch the display of the electronic such as when the hands of the user are dirty or wet.

Accordingly, embodiments of the present disclosure provide user interface mechanisms and methods in which the user can interact with the electronic device while not necessarily touching the electronic device or a user input device that is operably connected to the electronic device. For example, embodiments of the present disclosure provide system and methods for gesture recognition. A gesture refers to detected movements. For example, a gesture can be the detected movement of a body part of the user, such as the users hand or fingers. Additionally, embodiments of the present disclosure utilize 802.11ay radar for gesture recognition which concurrently supports both network functions as well as gesture recognition through radar. In certain embodiments, the electronic device can detect a gesture using 60 GHz radar and identify the signature of the gesture.

Embodiments of the present disclosure recognize and take into consideration that in gesture recognition identifying a random gesture or unintentional gesture can inadvertently instruct the electronic device to perform an unintended action. As such, the gestures used to control the electronic device need to have a strong signature. Embodiments of the present disclosure classify a gesture as a signature gesture, a non-signature gesture, or an invalid gesture. A signature gesture is used to trigger a well-defined function scenario and take a direct action. After a well-defined function scenario is triggered a non-signature gesture can be used to take a direct action. The signature gesture is more complex than the non-signature gesture. For example, a signature gesture has a distinct pattern to avoid a false detection. For instance, a signature gesture can include at least one repetition in one or more feature domains. As discussed in greater detail below, the feature domains include Doppler, Velocity, range, angles, and the like. It is noted that the reputation of a signature gesture can include a same gesture repeated, a flipped version of the gesture, or a combination thereof. FIGS. 4B and 4C, below, describe examples of both the signature gesture as well as a non-signature gesture.

After identifying a signature gesture, the electronic device performs an action (such as an operation with respect to an application). Alternatively, after identifying a signature gesture, the electronic device notifies the user to perform a non-signature gesture, and upon identifying the non-signature gesture, the electronic device will perform an action (such as an operation with respect to an application).

Embodiments of the present disclosure also provide systems and methods for a radar based gesture recognition using different antenna pairs. As such, the present disclosure provides systems and methods for identifying a gesture using signal processing. For example, embodiments of the present disclosure provide a gesture recognition system that detects a gesture and then classifies the gesture as a signature gesture, a non-signature gesture, or an invalid gesture. Based on the identified type of gesture the electronic device can perform an action that is indicated by the gesture.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

In certain embodiments, the server 104 is a neural network that is configured to extract features from images or radar signatures for gesture recognition purposes. In certain embodiments, a neural network is included within any of the client devices 106-114. When a neural network is included in a client device, the client device can user the neural network to extract features from images or radar signatures for gesture recognition purposes, without having to transmit content over the network 102. Similarly, when a neural network is included in a client device, the client device can user the neural network to classify a gesture as a signature gesture or a non-signature gesture.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals for gesture recognition via a radar transceiver.

In this example, some client devices 108 and 110-114 communicate indirectly with the network 102. For example, the mobile device 108 and PDA 110 communicate via one or more base stations 116, such as cellular base stations or eNodeBs (eNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s).

In certain embodiments, any of the client devices 106-114 transmit information securely and efficiently to another device, such as, for example, the server 104. Also, any of the client devices 106-114 can trigger the information transmission between itself and server 104. Any of the client devices 106-114 can function as a radar emitter and collector for gesture recognition purposes. After the gesture is identified, the client devices 106-114 can perform a corresponding action based on the gesture.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
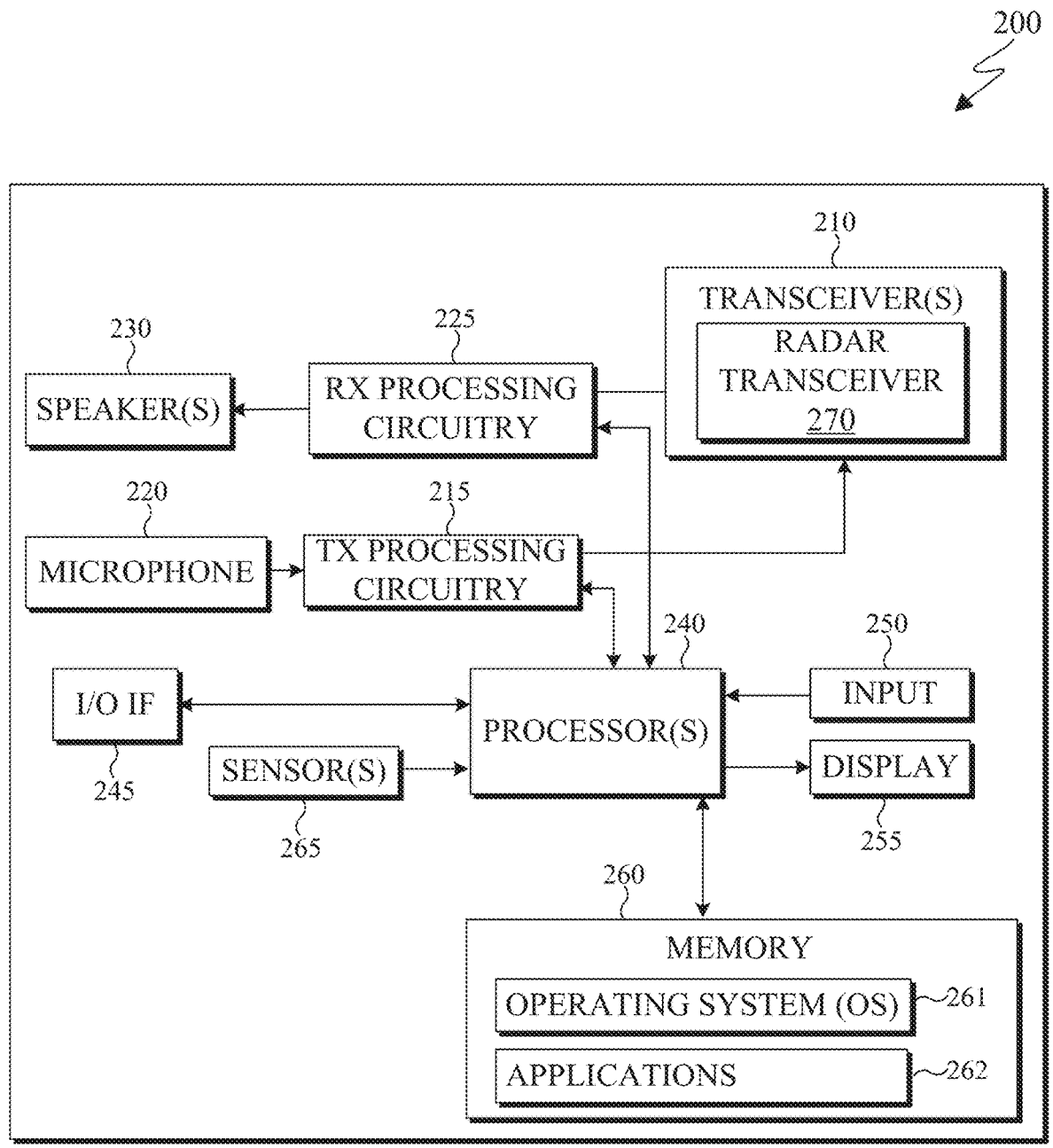
FIG. 2 illustrates an example electronic device according to embodiments of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type (s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like. The memory 260 can also include gesture recognition software that identifies, and classifies a gesture to be used as an input, such as the input 250.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the radar transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is a radar transceiver 270 that is configured to transmit and receive signals for detecting and ranging purposes. For example, the radar transceiver 270 may be any type of transceiver including, but not limited to a WiFi transceiver, for example, an 802.11ay transceiver. The radar transceiver 270 includes an antenna array. The radar transceiver 270 can transmit signals at a frequency less than or equal to 100 GHz. For example, the radar transceiver 270 can transmit signals at frequencies including, but not limited to, 6 GHz, 7 GHz, 8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 200.

In certain embodiments, the radar transceiver 270 can include a transmitter and a receiver. The transmitter can transmit millimeter wave (mmWave) signals. The receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the objection by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3A:
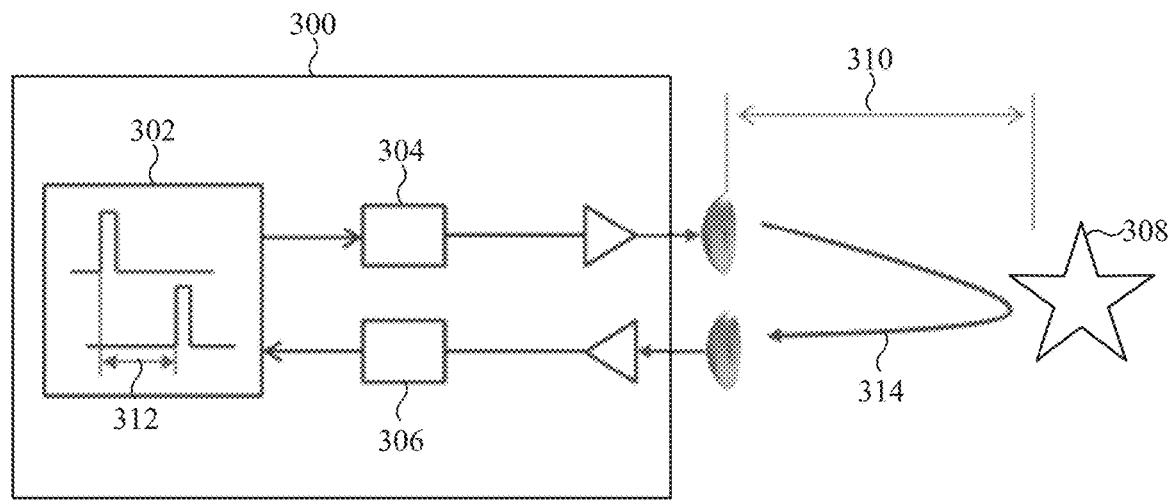
FIG. 3A illustrates an example architecture of a monostatic radar signal according to embodiments of this disclosure.
Figure 3B:
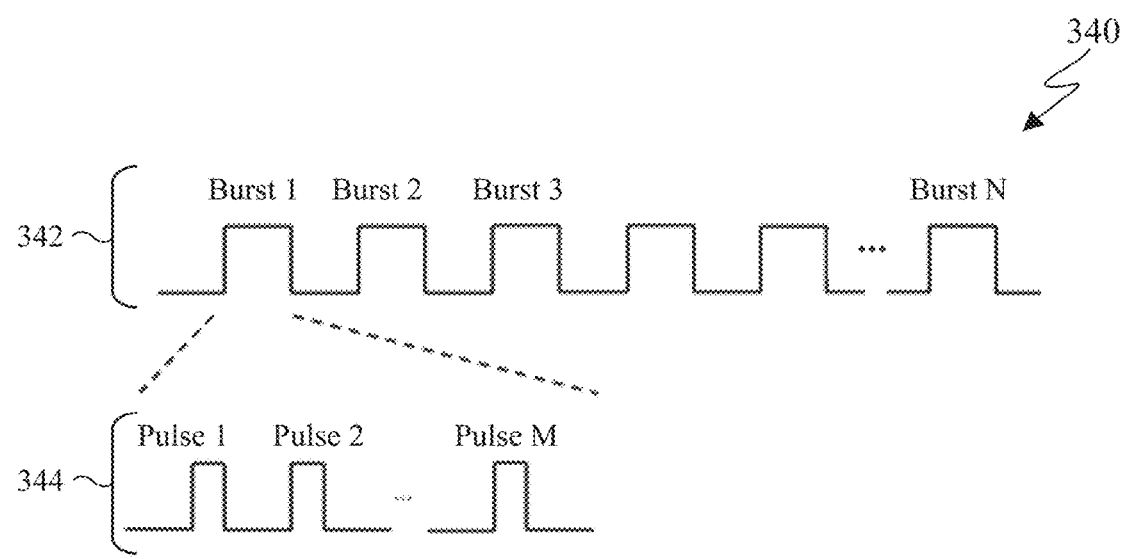
FIG. 3B illustrates an example frame structure according to embodiments of this disclosure.

FIG. 3A illustrates an example architecture of a monostatic radar in accordance with an embodiment of this disclosure. FIG. 3B illustrates an example frame structure 340 in accordance with an embodiment of this disclosure. The embodiments of FIGS. 3A and 3B are for illustration only and other embodiments can be used without departing from the scope of the present disclosure.

FIG. 3A illustrates an electronic device 300 that includes a processor 302, a transmitter 304, and a receiver 306. The electronic device 300 can be similar to any of the client devices 106-114 of FIG. 1, the server 104 of FIG. 1, or the electronic device 200 of FIG. 2. The processor 302 is similar to the processor 240 of FIG. 2. Additionally, the transmitter 304 and the receiver 306 can be included within the radar transceiver 270 of FIG. 2.

The transmitter 304 transmits a signal 314 to the target object 308. A target object 308 is located a distance 310 from the electronic device 300. In certain embodiments, the target object 308 of FIG. 3A is the hand of a user that is moving while performing a gesture. For example, the transmitter 304 transmits a signal 314. The signal 314 is reflected off of the target object 308 and received by the receiver 306. The signal 314 represents one or many signals that can be transmitted from the transmitter 304 and reflected off of the target object 308. The processor 302 can identify the gesture performed by the target object based on the receiver 306 receiving the multiple reflections of the signals.

In order to identify the gesture, the processor 302 analyzes a time difference 312 from when the signal 314 is transmitted by the transmitter 304 and received by the receiver 306. It is noted that the time difference 312 is also referred to as a delay, as it indicates a delay between the transmitter 304 transmitting the signal 314 and the receiver 306 receiving the signal after is reflected or bounced off of the target object 308. Based on the time difference 312, the processor 302 derives the distance 310 between the electronic device 300, and the target object 308. It is noted that the distance 310 can change such as when the target object 308 moves while performing a gesture or the electronic device 300 moves. When multiple signals, such as the signal 314 are transmitted and received, the processor 302 can generate a mapping indicating the overall movement of the target object 308. For example, the mapping can indicate the movement of the target object based on changes in the distance 310 as well as changes radial distance (a distance that is perpendicular to the distance 310).

Monostatic radar is characterized for its delayed echo as the transmitter 304 of the radar signal and the receiver 306 of the radar signal essentially at the same location. In certain embodiments, the transmitter 304 and the receiver 306 are co-located either by using a common antenna or nearly co-located but use separate but adjacent antennas. Monostatic radars are assumed coherent such that the transmitter 304 and the receiver 306 are synchronized via a common time reference Pulse radar is generated as a realization of a desired radar waveform, modulated onto a radio carrier frequency, and transmitted through a power amplifier and antenna, such as a parabolic antenna. In certain embodiments, the antenna is omnidirectional. In other embodiments, the antenna is focused into a particular direction. When the target object 308 is within the field of view of the transmitted signal and within a distance 310 from the radar location, then the target object 308 will be illuminated by RF power density (W/m$^2$), $p_t$, for the duration of the transmission. Equation (1) describes the first order of the power density, $p_t$.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \quad \text{Equation (1)}$$

Referring to Equation (1), $P_T$ is the transmit power (W). $G_T$ describes the transmit antenna gain (dBi) and $A_T$ is an effective aperture area (m$^2$). $\lambda$ corresponds to the wavelength of the radar signal RF carrier signal (m), and R corresponds to the distance 310 between the antenna and the target object 308. In certain embodiments, effects of atmospheric attenuation, multi-path propagation, antenna loss and the like are negligible, and therefore not addressed in Equation (1).

The transmit power density impinging onto the target object 308 surface can cause reflections depending on the material, composition, surface shape and dielectric behavior at the frequency of the radar signal. In certain embodiments, only direct reflections contribute to a detectable receive signal since off-direction scattered signals can be too weak to be received by at the radar receiver. The illuminated areas of the target with normal vectors pointing back at the receiver can act as transmit antenna apertures with directives (gains) in accordance with their effective aperture areas. Equation (2), below, describes the reflective back power.

$$P_{refl} = p_t A_t G_t \sim p_t A_t r_t \frac{A_t}{\lambda^2/4\pi} = p_t RSC \quad \text{Equation (2)}$$

In Equation (2), $P_{refl}$ describes the effective isotropic target-reflected power (W). The term, $A_t$ described the effective target area normal to the radar direction (m²). The term $r_t$ describes the reflectivity of the material and shape, which can range from [0, . . . , 1]. The term $g_t$ describes the corresponding aperture gain (dBi). RSC is the radar cross section (m²) and is an equivalent area that scales proportional to the actual reflecting area-squared inversely proportional with the wavelength-squared and is reduced by various shape factors and the reflectivity of the material itself. Due to the material and shape dependency, it is difficult to deduce the actual physical area of a target from the reflected power, even if the distance 310 to the target object 308 is known.

The target reflected power at the receiver location results from the reflected power density at the reverse distance 310 collected over the receiver antenna aperture area. Equation (3), below, describes the received target reflected power. It is noted that $P_R$ is the received target reflected power (W) and $A_R$ is the receiver antenna effective aperture area (m²). In certain embodiments, $A_R$ is the same as $A_r$.

$$P_R = \frac{P_{refl}}{4\pi R^2} A_R = P_T \cdot RSC \frac{A_T A_R}{4\pi \lambda^2 R^4} \quad \text{Equation (3)}$$

A radar system can be used as long as the receiver signal exhibits sufficient signal-to-noise ratio (SNR). The value of SNR depends on the waveform and detection method. Equation (4), below, describes the SNR. It is noted that kT is the Boltzmann constraint multiplied by the current temperature. B is the radar signal bandwidth (Hz). F is the receiver noise factor which is a degradation of the receive signal SNR due to noise contributions of the receiver circuit itself.

$$SNR = \frac{P_R}{kT \cdot B \cdot F} \quad \text{Equation (4)}$$

When the radar signal is a short pulse of duration or width, $T_p$, the delay or time difference 312 between the transmission and reception of the corresponding echo is described in Equation (5). τ corresponds to the delay between the transmission and reception of the corresponding echo and equal to Equation (5). c is the speed of light propagation in the air. When there are multiple targets at different distances, individual echoes can be distinguished only if the delays differ by at least one pulse width. As such, the range resolution of the radar is described in Equation (6). A rectangular pulse of a duration $T_P$ exhibits a power spectral density as described in Equation (7) and includes a first null at its bandwidth as shown in Equation (8). The range resolution of a radar signal fundamental connected with the bandwidth of the radar waveform is expressed in Equation (9).

$$\tau = 2R/c \quad \text{Equation (5)}$$

$$\Delta R = c\Delta\tau/2 = cT_P/2 \quad \text{Equation (6)}$$

$$P(f) \sim (\sin(\pi f T_p)/(\pi f T_p))^2 \quad \text{Equation (7)}$$

$$B = 1/T_P \quad \text{Equation (8)}$$

$$\Delta R = c/2B \quad \text{Equation (9)}$$

Depending on the radar type, various forms of radar signals exist. One example is a Channel Impulse Response (CIR). CIR measures the reflected signals (echoes) from potential targets as a function of distance at the receive antenna module, such as the radar transceiver 270 of FIG. 2. In certain embodiments, CIR measurements are collected from transmitter and receiver antenna configurations which when combined can produce a multidimensional image of the surrounding environment. The different dimensions can include the azimuth, elevation, range, and Doppler.

The example frame structure 340 of FIG. 3B illustrates a frame with multiple bursts 342. For example, the example frame structure 340 includes burst 1, burst 2, burst 3, through bust N. Each bust includes multiple pulses 344, such as pulse 1, pulse 2 through pulse M. In certain embodiments, different transmit and receive antenna configurations activate for each pulse or each burst. In certain embodiments, different transmit or receive antenna configurations activate for each pulse or each burst. It is noted that although the example frame structure 340 illustrates only one burst type, multiple burst types can be defined in the same frame, where each burst type includes a different antenna configuration.

Raw radar measurement can be based on a pulse compression radar signal. For example, the frame structure 340 can represent an example timing diagram of a radar measurement. Time is divided into multiple frames, and each frame is further divided into bursts 342. Several pulses 344 are transmitted by the radar transmitter in each burst 342. In certain embodiments, each pulse or burst may have a different transmit/receive antenna configuration corresponding to the active set of antenna elements and corresponding beamforming weights. For example, each of the M pulses in a burst has a different transmit and receive antenna pair, and each of the bursts 342 all repeat the same pulses. As such, all of the signals from all the pulses within a burst provide a complete scan of the radar field of view, and the repetitions across the bursts provide a way to capture the temporal variation. The temporal variation can be considered Doppler information. The example frame structure 340 illustrates uniform spacing between pulses and bursts. In certain embodiments, any the spacing, even non-uniform spacing, between pulses and bursts can be used.

An example radar measurement may be a three-dimensional (3D) CIR matrix. The first dimension corresponds to the burst index, the second dimension corresponds to the pulse index, and the third dimension corresponds to the delay tap index. The delay tap index can be translated to the measurement of range or equivalently the flight time received signal (the time duration between transmitting and receiving the signal).

Although FIGS. 3A and 3B illustrate electronic device 300 and radar signals various changes can be made to FIGS. 3A and 3B. For example, different antenna configurations can be activated. FIGS. 3A and 3B do not limit this disclosure to any particular radar system or apparatus.

Figure 4A:
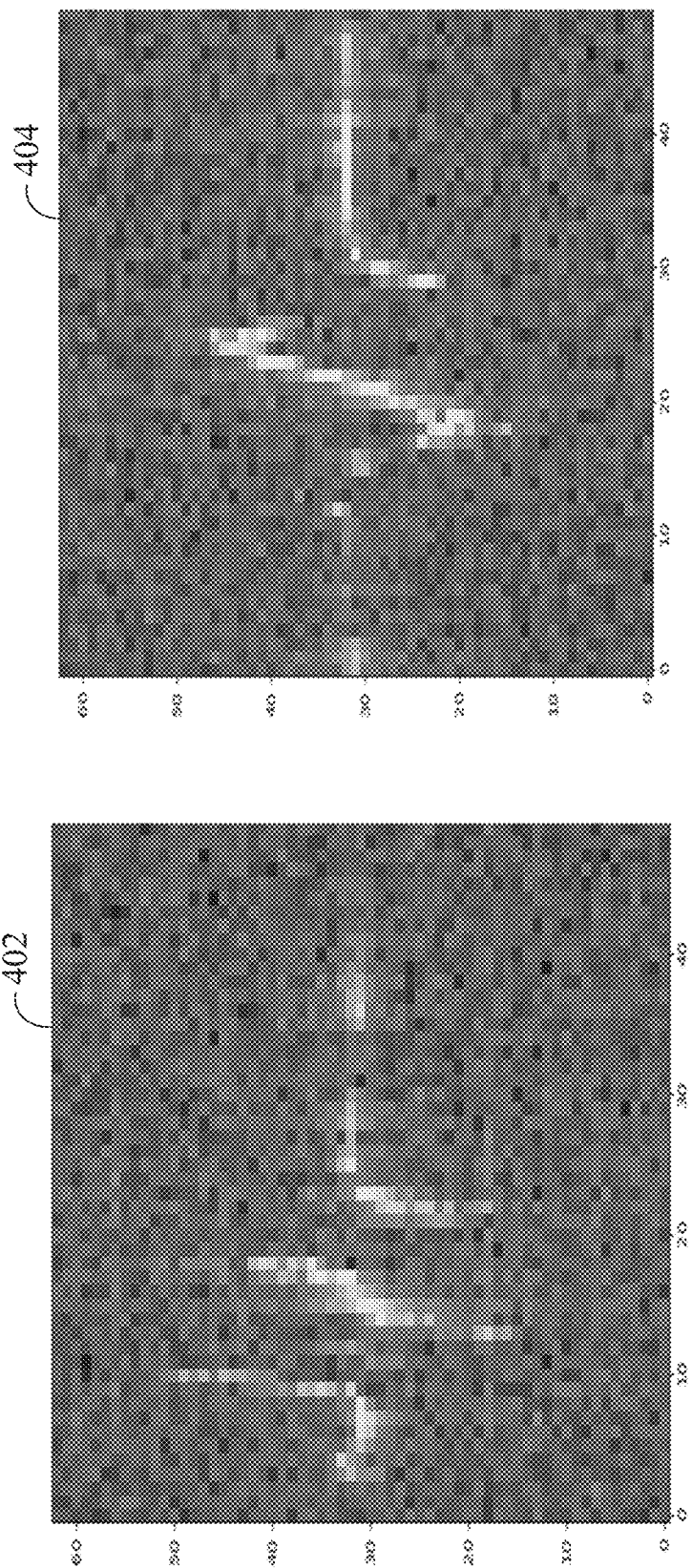
FIG. 4A illustrates an example graph of a signature gesture and an example graph of a non-signature gesture according to embodiments of this disclosure.
Figure 4B:
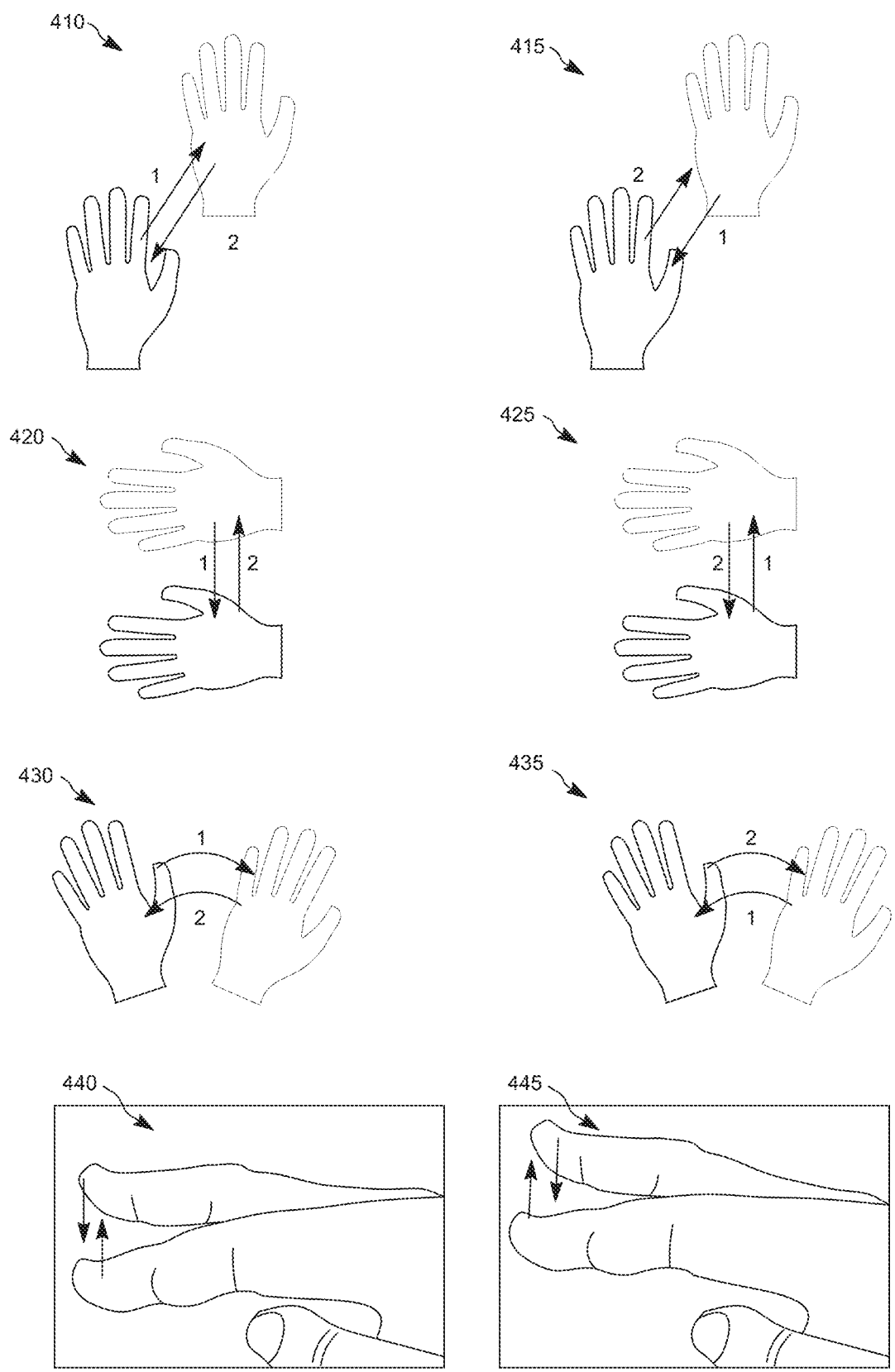
FIGS. 4B and 4C illustrate various gestures according to embodiments of this disclosure.
Figure 4C:
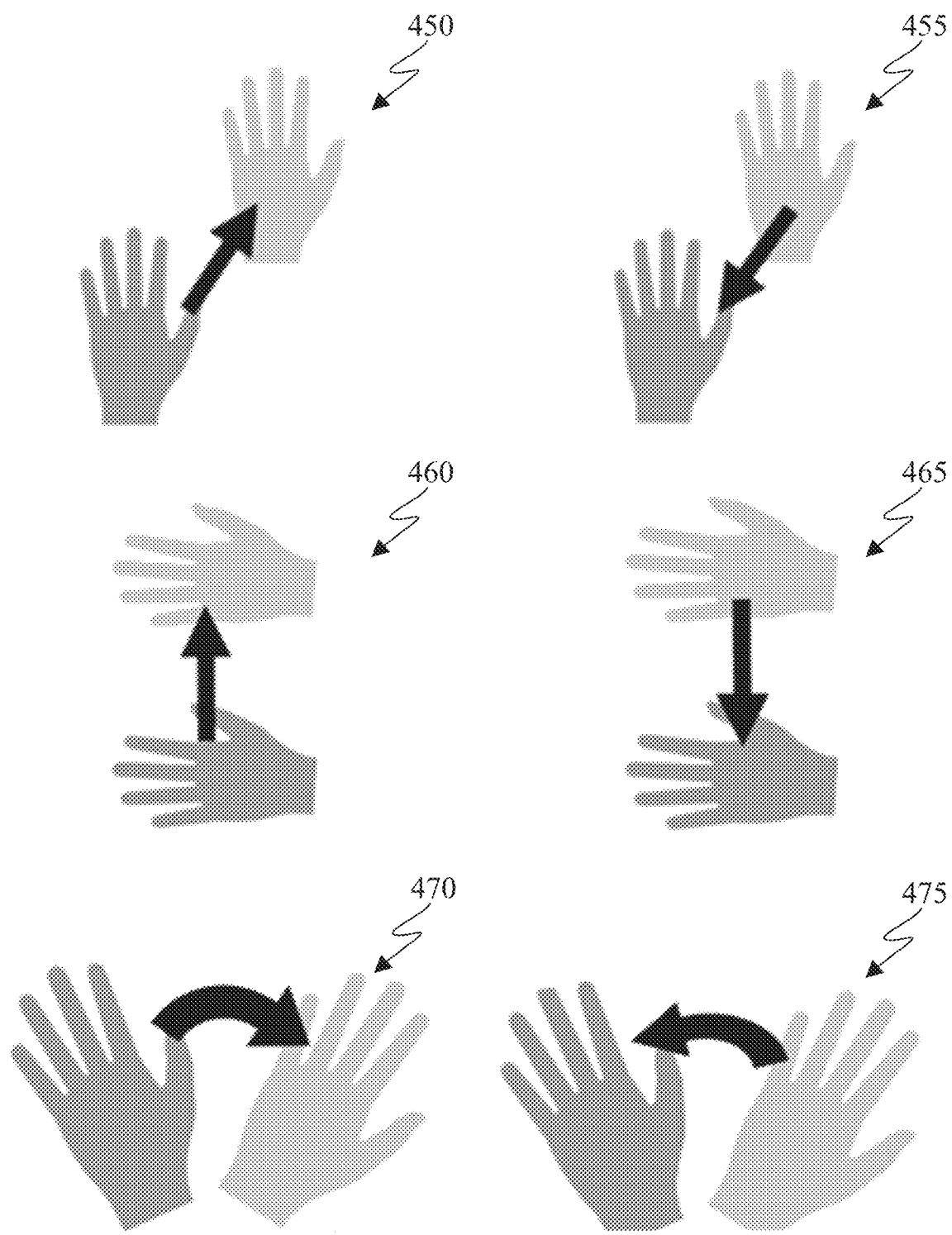

FIG. 4A illustrates an example graph 402 of a signature gesture and an example graph 404 of a non-signature gesture according to embodiments of this disclosure. FIGS. 4B and 4C illustrate various gestures according to embodiments of this disclosure. The gestures a shown in FIGS. 4B and 4C are a non-inclusive list of gestures. The gestures as shown in FIGS. 4B and 4C are for illustration only. Other gestures can be used without departing from the scope of the present disclosure.

According to embodiments of the present disclosure, gestures are classified into two categories, a signature gesture, and a non-signature gesture. A third category can correspond to a gesture that is neither a signature gesture nor a non-signature gesture. A signature gesture is more complex than a non-signature gesture yielding a stronger signature or pattern as compared to the non-signature gesture. A non-signature gesture generally has simpler movements and can have a weaker signature or pattern for identification purposes. For example, a signature gesture can include at least one repetition in one or more feature domains such as Doppler, Velocity, range, and the like. It is noted that the reputation of a signature gesture can include a same gesture repeated, a flipped version of the gesture, or a combination thereof. Due to the repetition of the signature gesture, it unlikely that a signature gesture is unintentionally performed by a user while a non-signature gesture might be performed unintentionally by a user. The gestures described in FIG. 4B are example signature gestures while the gestures described in FIG. 4C are example non-signature gestures.

The graph 402 of FIG. 4A illustrates a signature gesture while the graph 404 illustrates a non-signature gesture. The graphs 402 and 404 plot the speed (Doppler) on the Y axis and time index on the X axis. In certain embodiments, the Y axis can be range or angle instead of Doppler. The signature gesture as illustrated in the graph 402 is repeated as indicated by the two maximum and two minimum values while the non-signature gesture as illustrated in the graph 404 is not repeated as indicated by a single maximum and minimum value.

The radar transceiver, such as the radar transceiver 270 of FIG. 2, can detect movement associated with a gesture in three dimensions. For example, the gestures 410, 415, 440, 445, 450, 455, 470, and 472 represent gestures in the Z direction. That is, the gestures correspond to changing the distance between the hand of the user (such as the target object 308 of FIG. 3A) and the electronic device itself (such as the electronic device 300 of FIG. 3A). For another example, the gestures 420, 425, 460, and 465 represent gestures in the Y direction, while the gestures 430, 435, 470, 475 represent gestures in the X direction. It is noted that the movement of the gestures are not limited to these specific directions. For example, gestures can include movement in two or three different directions.

Signature gestures are gestures with compound movement such that multiple movements are performed during a signature gesture. For example, the gesture 410 represents a push pull gesture. The gesture 410 the hand of the user moves towards the radar transceiver of the electric device and then away from the radar transceiver of the electric device. The gesture 415 represents a pull push gesture. The gesture 415 the hand of the user moves away from the radar transceiver of the electric device and then towards the radar transceiver of the electric device. It is noted that the gesture 410 is similar to the gesture 415 as both change in the Z direction, but in reverse order. For example, during the gestures 410 and 415, the vertical distance between the hand of the user and the electronic device changes.

The gesture 420 represents a swipe up down gesture. When the gesture 420 is performed, the hand of the user moves vertically with respect to the radar transceiver of the electric device and then moves in the opposite direction. For example, the hand of the user first moves up and then down. The gesture 425 is similar to the gesture 420 as the gesture 425 represents a swipe down up gesture.

The gesture 430 represents a swipe right left gesture. When the gesture 430 is performed, the hand of the user moves horizontally with respect to the radar transceiver of the electric device and then moves in the opposite direction. For example, the hand of the user first moves right and then left. The gesture 325 is similar to the gesture 430 as the gesture 435 represents a swipe left right.

The gestures 440 and 445 represent finger drumming. That is, two fingers of the user alternate moving up and down with respect to the radar transceiver of the electric device.

The gestures 450 and 455 of FIG. 4C are similar to the gestures 410 and 415 of FIG. 4B. The gesture 450 is a push gesture while the gesture 455 is a pull gesture. The gesture 450 occurs when the hand of the user moves towards the radar transceiver of the electric device while the gesture 455 occurs when the hand of the user moves away from the radar transceiver of the electric device.

The gestures 460 and 465 of FIG. 4C are similar to the gestures 420 and 425 of FIG. 4B. The gesture 460 is a swipe up gesture while the gesture 465 is a swipe down gesture. The gesture 460 occurs when the hand of the user moves in a first vertical direction with respect to the radar transceiver of the electric device while the gesture 465 occurs when the hand of the user moves in vertical direction that is opposite the first vertical direction with respect radar transceiver of the electric device.

The gestures 470 and 475 of FIG. 4C are similar to the gestures 430 and 435 of FIG. 4B. The gesture 470 is a swipe right gesture while the gesture 475 is a swipe left gesture. The gesture 470 occurs when the hand of the user moves in a first horizontal direction with respect to the radar transceiver of the electric device while the gesture 475 occurs when the hand of the user moves in horizontal direction that is opposite the first horizontal direction with respect radar transceiver of the electric device.

The signature gestures of FIG. 4B include multiple movements with distinctive patterns that do not easily generate false detections due to random gestures. In contrast the non-signature gestures of FIG. 4C represent simple gestures that can be easily recognized but could yield false detection due to a random movement of the user. In certain embodiments, an electronic device identifies non-signature gestures after identifying certain signature gesture or after a particular event. For example, if the user activates the virtual personal assistant the user can then perform a non-signature gesture, which when identified by the electronic device, performs a corresponding action.

In certain embodiments, the signature gestures of FIG. 4B can be used in scenarios that require a higher accuracy while the non-signature gestures of FIG. 4C can be used in scenarios that require a lower accuracy. For example, a signature gesture can be performed to answer a phone call or triggering a new function scenario while a non-signature gesture can trigger an intuitive or alter the volume once the phone call is accepted.

Although FIGS. 4A, 4B, and 4C illustrate gestures that can be identified that perform actions on the electronic device 200 to various changes can be made to FIGS. 4A, 4B, and 4C. For example, different gestures can be included in the signature gestures of FIG. 4B and the non-signature gestures of FIG. 4C. As such, FIGS. 4A, 4B, and 4C do not limit this disclosure to any particular gesture.

Figure 5A:
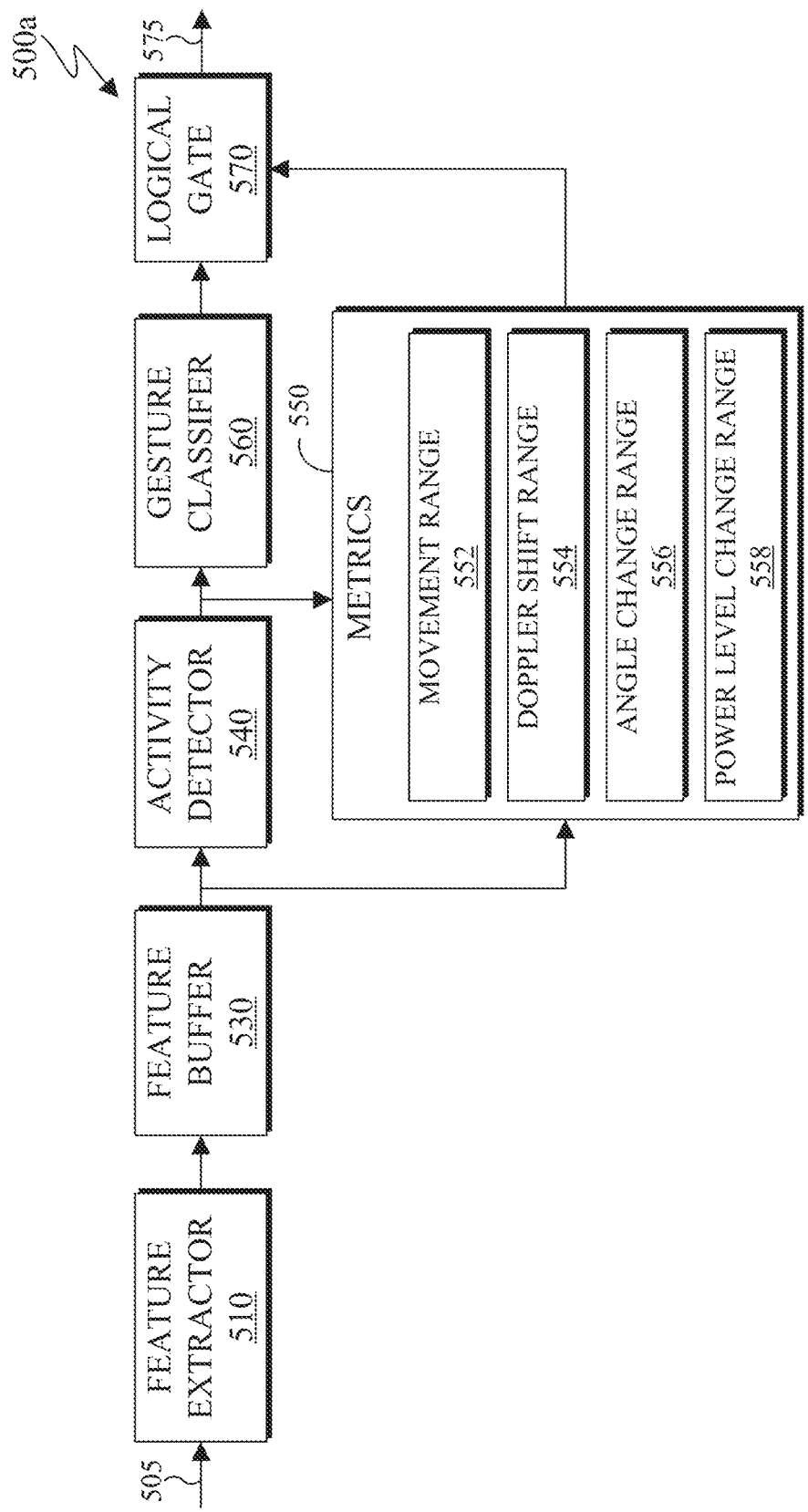
FIGS. 5A, 5B, and 5C illustrate signal processing diagrams for gesture recognition according to embodiments of this disclosure.
Figure 5B:
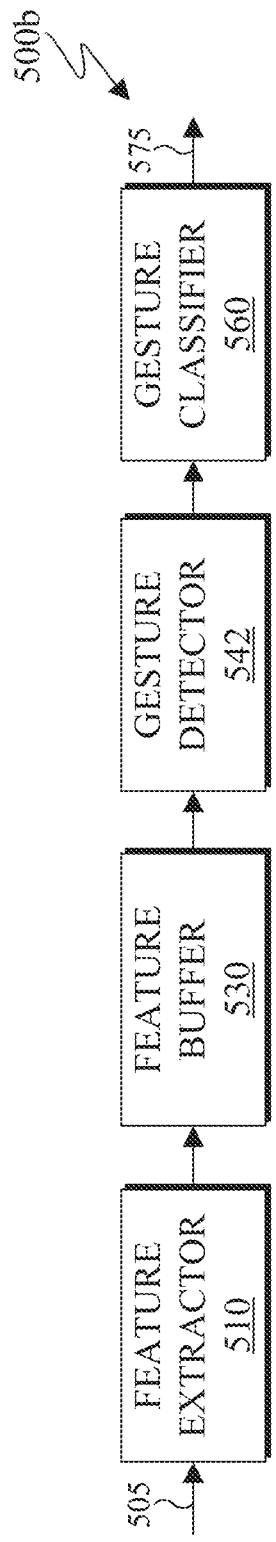
Figure 5C:
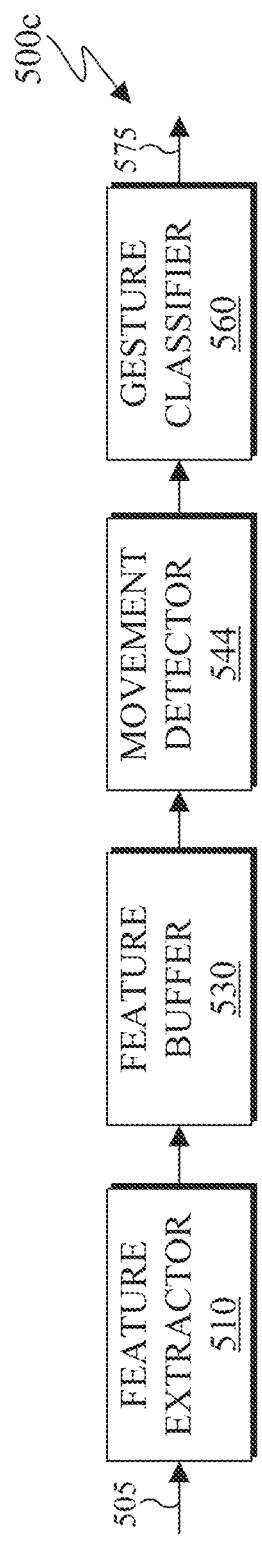
Figure 5D:
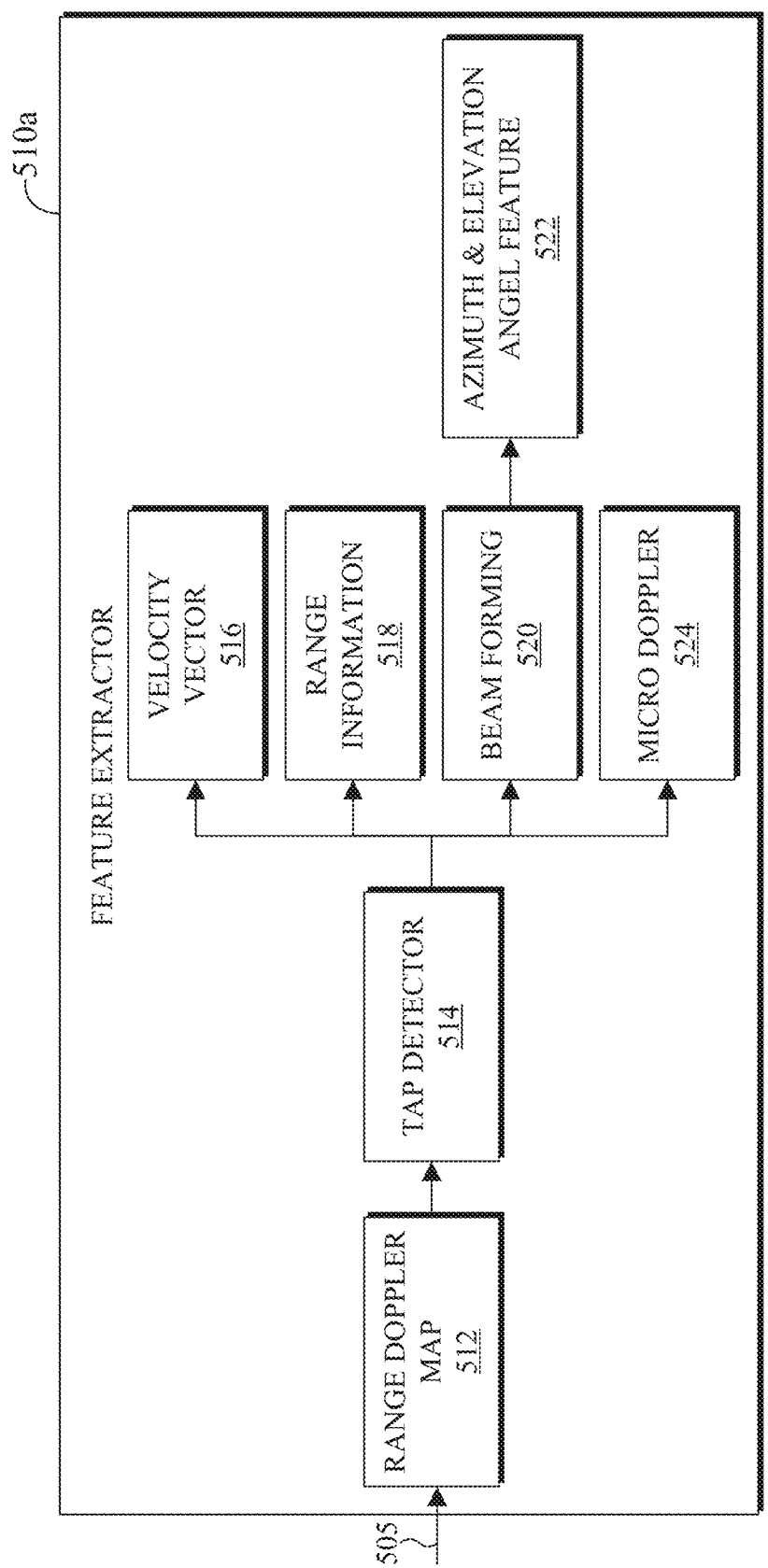
FIGS. 5D, 5E, and 5F illustrate flowcharts for feature extraction according to embodiments of this disclosure.
Figure 5E:
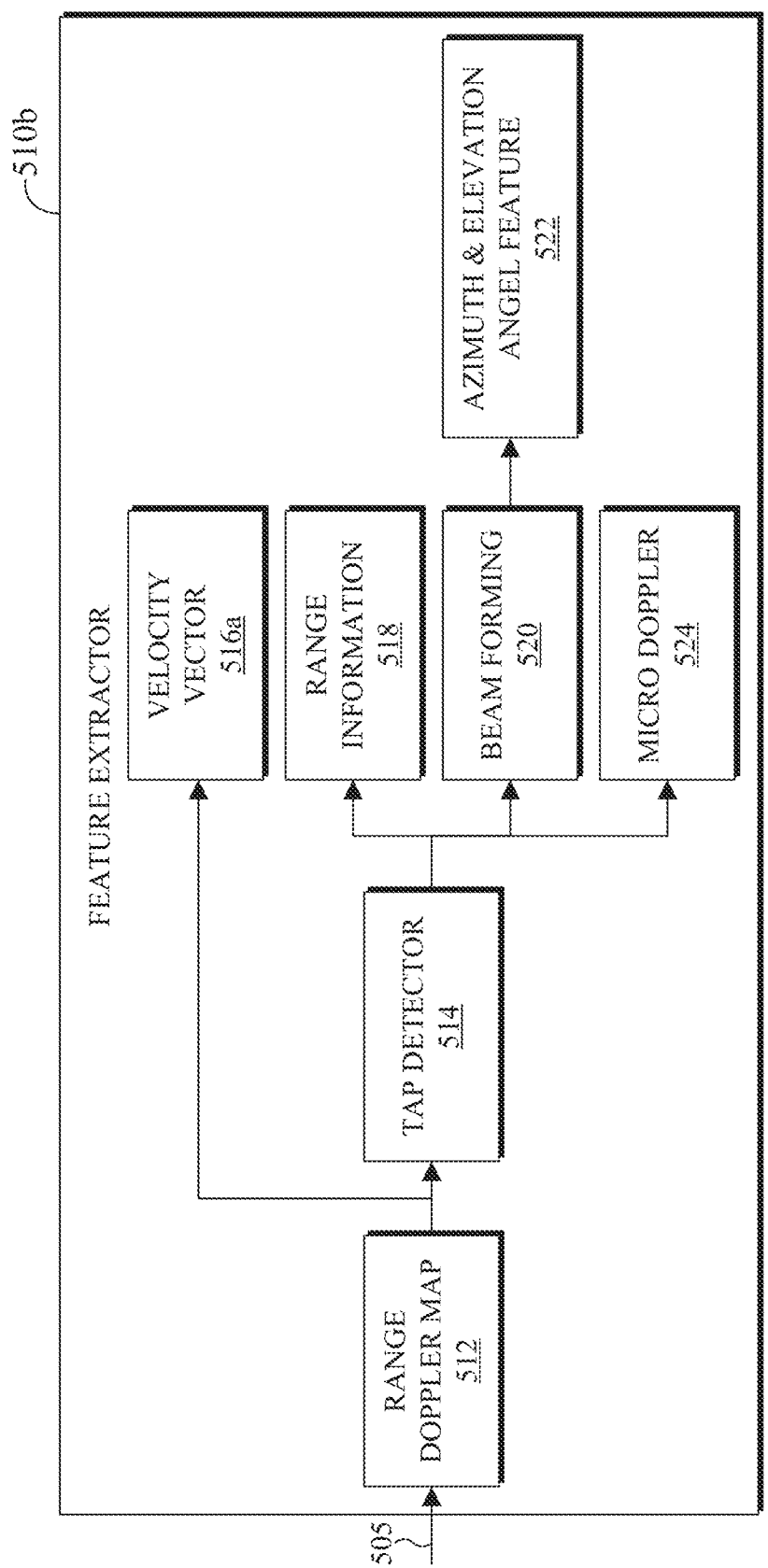
Figure 5F:
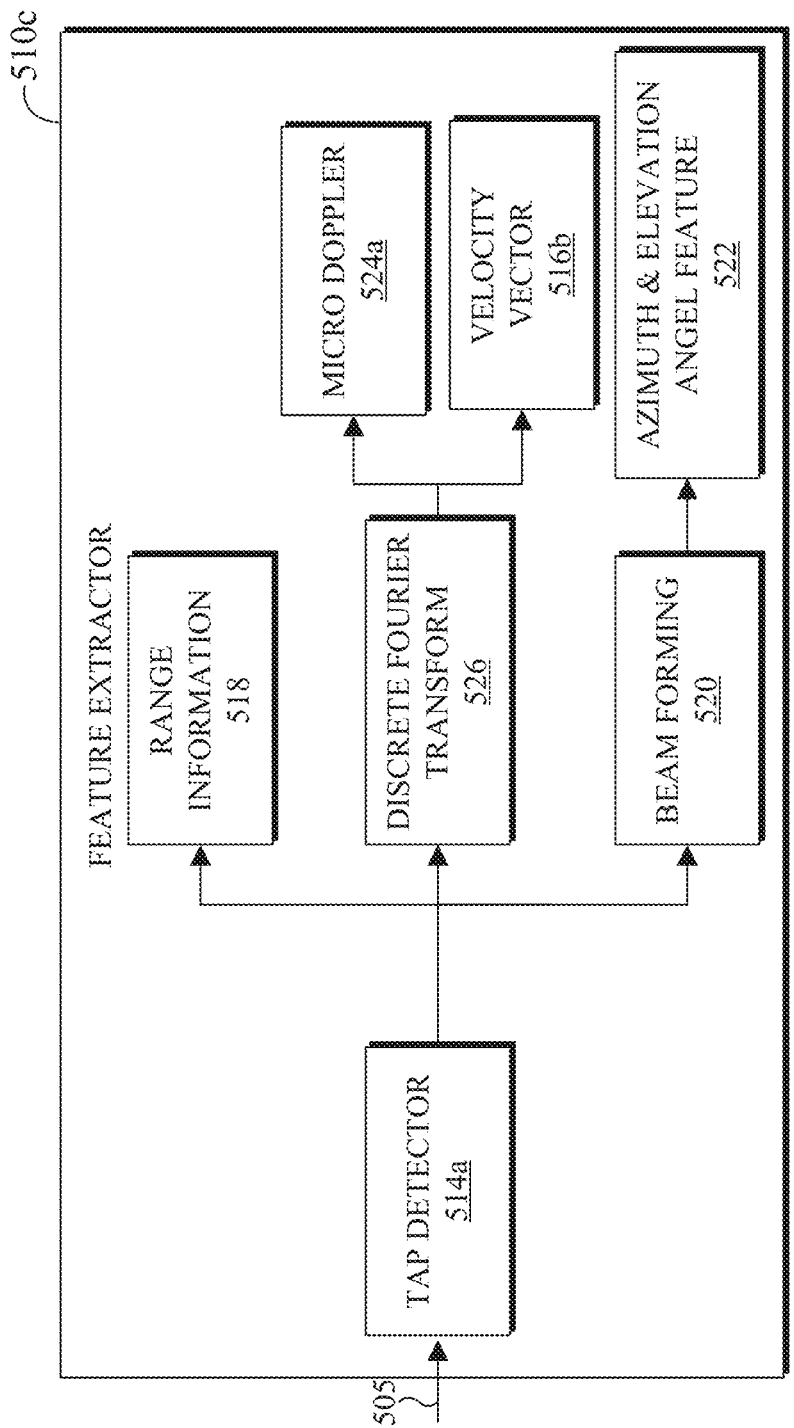
Figure 5G:
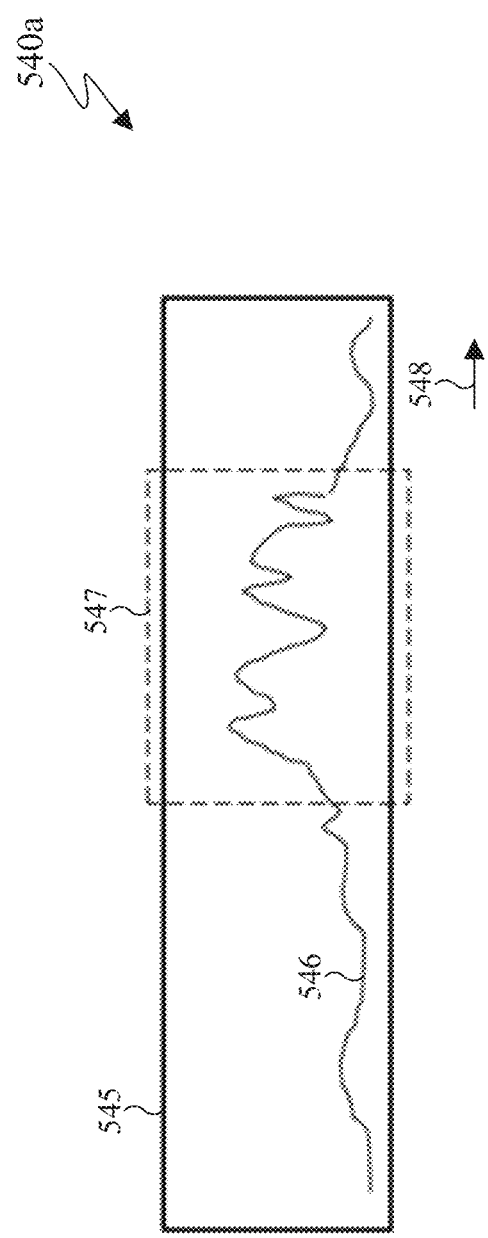
FIG. 5G illustrates a diagram of a sliding window for activity detection according to embodiments of this disclosure.
Figure 5H:
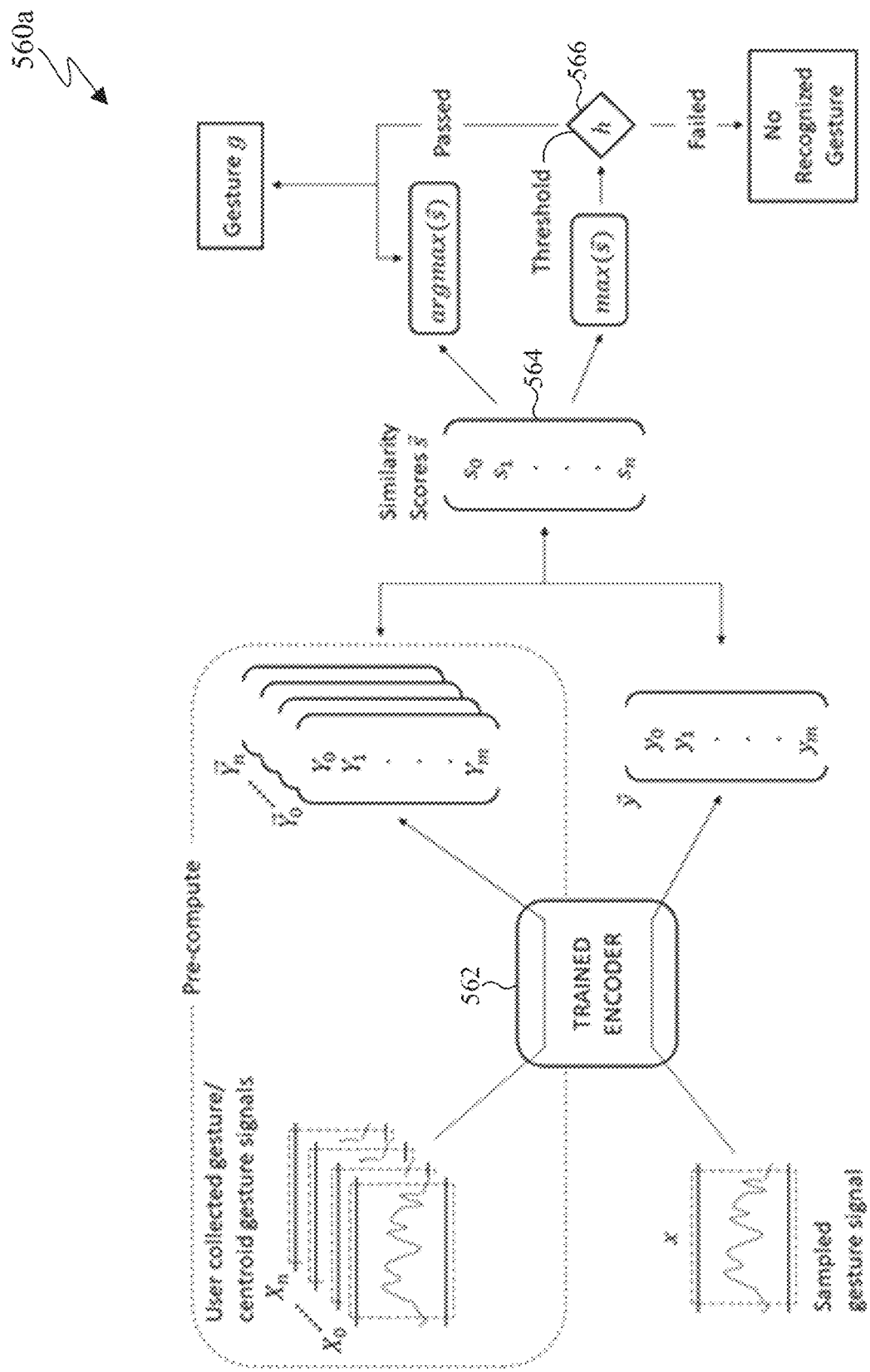
FIG. 5H illustrates a block diagram of a neural network for classifying gestures according to embodiments of this disclosure.
Figure 5I:
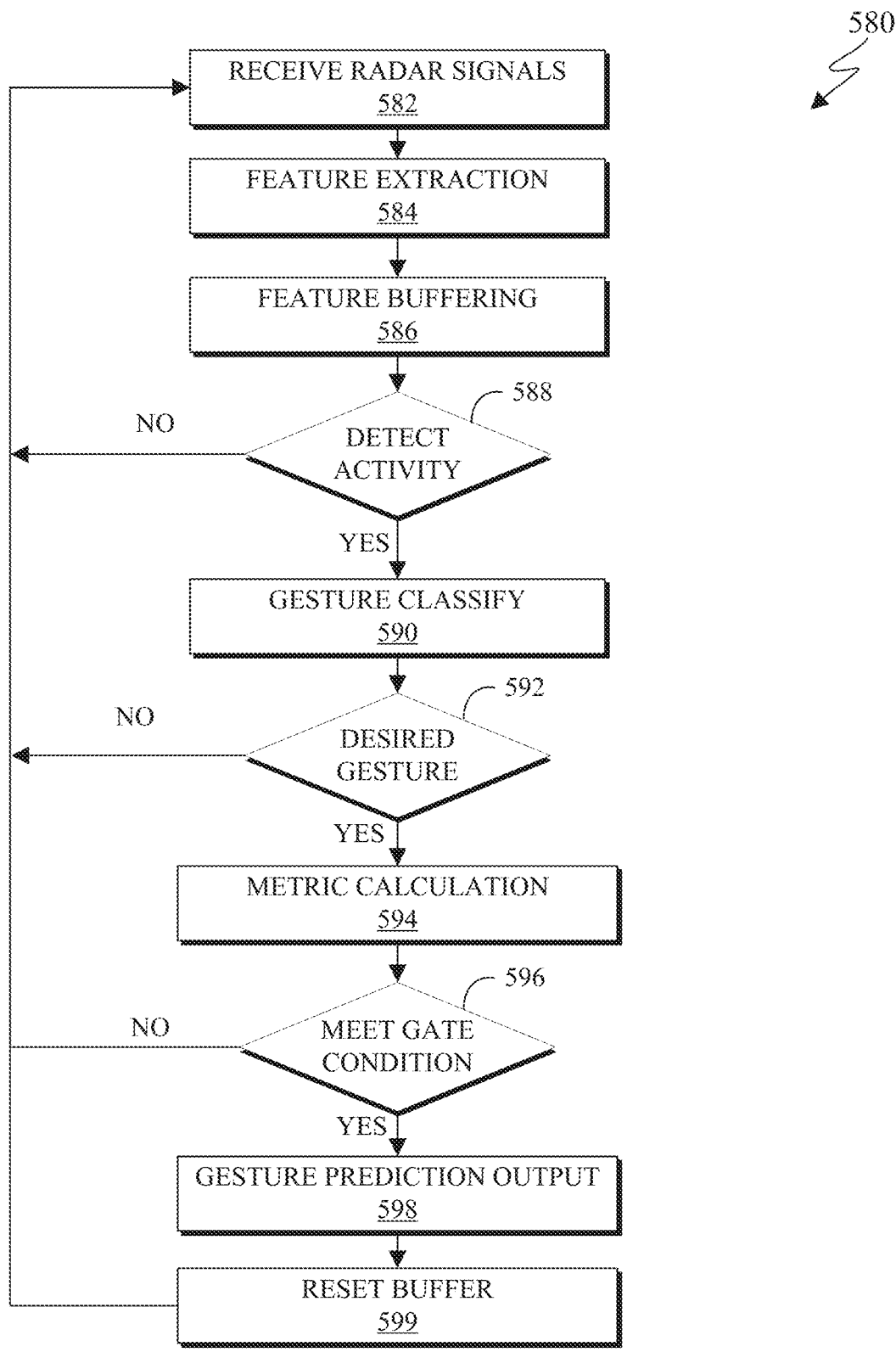
FIG. 5I illustrates a method for gesture recognition according to embodiments of this disclosure.

FIGS. 5A, 5B, and 5C respectively illustrate signal processing diagrams 500a, 500b, and 500c for gesture recognition according to embodiments of this disclosure. For example, the signal processing diagrams 500a, 500b, and 500c of FIGS. 5A, 5B, and 5C respectively, illustrate signal processing embodiments describing how the electronic device 200 of FIG. 2 recognizes a gesture and classifies the gesture as a signature gesture, a non-signature gesture, or an invalid gesture. FIGS. 5D, 5E, and 5F illustrate flowcharts for feature extraction according to embodiments of this disclosure. FIG. 5G illustrates a diagram 540a of a sliding window 547 for activity detection according to embodiments of this disclosure. FIG. 5H illustrates a block diagram of a neural network 560a for classifying gestures according to embodiments of this disclosure. FIG. 5I illustrates a method 580 for gesture recognition according to embodiments of this disclosure. Various changes can be made to FIGS. 5A-5I. For example, while various embodiments are shown as a series of steps, various steps could overlap, occur in parallel, or occur multiple times.

FIGS. 5A, 5B, and 5C illustrate various signal processing diagrams for receiving raw radar signals 505 and generating an output 575. The signal processing diagram 500a includes a feature extractor 510, a feature buffer 530, an activity detector 540, a metric 550, a gesture classifier 560, and a logical gate 570.

The feature extractor 510 extracts features from the raw radar signals 505 that are used for classifying a gesture. In certain embodiments, the feature vectors which are extracted from the raw radar signals 505, by the feature extractor 510, can be stacked frame by frame. Staking the feature vectors forms a 2 dimensional matrix. The matrix can be treated as a time sequence and fed into a long shot-term memory (LSTM) neural network. Alternatively, the matrix can be treated as an image for fed into a convolutional neural network (CNN). FIGS. 5D, 5E, and 5F below describe the feature extractor 510 in greater detail.

In gesture recognition, the extracted features include range feature, velocity/Doppler feature, Range-Doppler map (RDM) feature, time-velocity diagram (TVD), angle feature and micro Doppler feature of the moving target object (such as the human body part that is performing the gesture). These features are used to track the motion of target object (such as the human body part that is performing the gesture). For certain gestures definition, only one of the features is needed. For certain gestures definition, more than one of the features are needed.

The range feature refers to the proximity information between the radar antennas and the target object (such as the human body part that is performing the gesture). The range feature can be extracted by object detection. For example, in CIR signal, the range feature can be translated into delay taps.

The velocity feature refers to the radial velocity information between the radar antennas and the target object (such as the human body part that is performing the gesture). RDM, TVD and micro Doppler feature can be calculated from range and velocity features.

The angle feature refers to the azimuth/elevation angles information of the target object (such as the human body part that is performing the gesture) relative to the radar antennas. The angle feature can be extracted by beamforming.

The feature buffer 530 stores a history of the features that are extracted by the feature extractor 510. In certain embodiments, the feature buffer 530 is a circular buffer. In certain embodiments, the feature buffer 530 is a first in first out (FIFO) memory.

The activity detector 540 of FIG. 5A can include the gesture detector 542 of FIG. 5B, the movement detector 544 of FIG. 5C or a combination thereof. FIG. 5G below, describes using a sliding window for activity detection by the activity detector 540.

The activity detector 540 can identify a starting point and an ending point of the gesture. For example, the activity detector 540 determines the starting time and ending time of gestures being performed in a stream of data (one of the extracted features). In certain embodiments, the activity detector 540 detects activity based on the differences between extracted features from the feature extractor 510, such as range, velocity, angle features, and the like. For example, the activity detector 540 identifies differences between the non-gesture portion and the gesture portion of the features.

Additionally, the activity detector 540 defines one or more regions of interest with arbitrary lengths on the extracted feature stream. The regions of interest become candidates for gesture recognition. The activity detector 540 can also identify multiple region of interests within a single data stream, if there are multiple gestures within the given data stream.

The activity detector 540 can also include algorithms to identify the signatures of the desired gestures. For example, the activity detector 540 uses an auto-correlation algorithm, a match filter algorithm, a zero crossing algorithm, a peak counting algorithm, or the like to detect the signatures of the desired gestures. The activity detector 540 can filter signals that do not correspond to any gesture.

The signature definitions of different gesture can vary widely. Therefore, in certain embodiments, machine learning technology including neural networks can be used by activity detector 540 to predict regions of interest. In other embodiments, a cross-correlation algorithm can be used to identify a gesture. For example, if the signature of a gesture includes at least one repetition in a feature or domain, an auto-correlation algorithm can identify the repetition signature of the gestures. In yet other embodiments, the activity detector 540 can use a rule based algorithm when the signature of the gesture is formulated with respect to one or more rules. For example, if the numbers of zero-crossing for all the desired gestures in TVD feature fall into a certain range, then the activity detector 540 can use the number of zero-crossing as a rule to identify certain gestures.

The metrics 550 are based the buffered features via the feature buffer 530 when movement is detected by the activity detector 540. That is, when movement is detected, the metrics 550 are identified. The metrics 550 include a movement range 552, a Doppler shift range 554, an angle change range 556, and a power level change range 558. The various metric 550 can be used by the logical gate 570 to determine whether the output of the gesture classifier 560 meets a logical baseline.

Movement range 552 is associated with distance. By identifying the taps across the frames, the distance is identified by obtaining the distance from the radar signals to the moving object for each frame. The movement range 552 is identified by the differentiation on the farthest distance to the closest distance.

The Doppler shift range 554 is associated with a Doppler or velocity vector (or both) for each frame. The processor 240 identifies the largest power value from the vector and the corresponding Doppler frequency is treated as the Doppler component for a frame. The Doppler shift range 554 corresponds to the range of the Doppler component that varies within a predefined period.

The angle change range 556 is associated with both the Azimuth angle change range and the elevation angle change range. The processor 240 identifies the largest power values from the Azimuth angle vector and the Elevation angle vector that are generated by beamforming. In certain embodiments, the corresponding Azimuth angle and Elevation angle are recorded as the Azimuth angle and the Elevation angle. The processor 240 identifies both the angle change for the Azimuth angle and the angle change for the Elevation angle respectively. That is, the angle change range 556 represents both angle change for the Azimuth angle and the angle change for the Elevation angle.

The power level change range 558 is associated with the largest power value in a beamforming result matrix on selected taps. The power level change range 558 is identified by the change of power within certain frames.

The gesture classifier 560 classifies the detected gesture as a signature gesture or a non-signature gesture. The gesture classifier 560 also determines whether a received signal does not correspond with any gesture such as a gesture that was performed by a user unintentionally. In certain embodiments, the gesture classifier 560 is a machine learning based classifier such as a support vector machine (SVM), a random forest, K-nearest neighbor (KNN), and the like. The gesture classifier 560 can also be a neural network based classifier. For example, the gesture classifier 560 can be a CNN a multilayer perceptron (MLP), a LSTM, and the like. The gesture classifier 560 can be trained to classifier particular gestures. For example, if there are N gestures, the gesture classifier 560 can be trained on each class. That is, each gesture corresponds to one class. Alternatively, if there are N gestures, the gesture classifier 560 can be trained on N+1 class, such that each gesture is one class and all other gestures are counted as an additional class.

The logical gate 570 determines whether the output of the gesture classifier 560 meets a logical baseline as indicated by the metrics 550. In certain embodiments, the logical gate 570 performs a different condition for each gesture that is identified by the gesture classifier 560. The condition that is associated with each gesture can apply predefined thresholds to the metrics 550.

For example, when the gesture classifier 560 classifies a gesture as a waving gesture (similar to the gestures 430, 435, 470, and 475) the logical gate 570 can verify the gesture based on four conditions. The logical gate 570 determines that the gesture is a wave gesture when the movement range 552 is larger than a first threshold, the Doppler shift range 554 is larger than a second threshold, the azimuth angle change (part of the angle change range 556), is more than a third threshold, and the elevation angle change (part of the angle change range 556), is less than a fourth threshold.

For another example, when the gesture classifier 560 classifies a gesture as a drumming gesture, (similar to the gestures 440 and 445) the logical gate 570 can verify the gesture based on four conditions. The logical gate 570 determines that the gesture is a drumming gesture when the movement range 552 is less than a first threshold, the Doppler shift range 554 is larger than a second threshold, the azimuth angle change (part of the angle change range 556), is less than a third threshold, and the power level change range 558 is larger than a fourth threshold.

Certain elements of the signal processing diagram 500a are also included in the signal processing diagram 500b of FIG. 5B as well as the processing diagram 500c of FIG. 5C. For example, the feature extractor 510 of FIG. 5A is similar to the feature extractor 510 of FIGS. 5B and 5C. Similarly, the feature buffer 530 of FIG. 5A is similar to the feature buffer 530 of FIGS. 5B and 5C. Additionally, the gesture classifier 560 of FIG. 5A is similar to the gesture classifier 560 of FIGS. 5B and 5C. As such, the descriptions of the feature extractor 510, the feature buffer 530, and the gesture classifier 560 of FIGS. 5B, and 5C are described in FIG. 5A above.

The gesture detector 542 of FIG. 5B is similar to the activity detector 540 of FIG. 5A. The gesture detector 542 identifies the starting point and the ending point of a gesture. After detecting a gesture, the gesture detector 542 can trigger the gesture classifier 560 to classifier the detected gesture. In certain embodiments, the gesture detector 542 filters any gestures. For example, the gesture detector 542 does not trigger the gesture classifier 560 if it determines that the detected gesture was an unintentional gesture.

The movement detector 544 of FIG. 5C is similar to the activity detector 540 of FIG. 5A. The movement detector 544 identify whether there is movement. The movement detector 544 does not determine whether the movement is a desired gesture. After identifying movement, the movement detector 544 triggers the gesture classifier 560 to classify the gesture. Since the movement detector 544 does not filter the gesture, the gesture classifier 560 is tried with N+1 classes, where N corresponds to the number of gestures and the additional class corresponds to the unintentional gesture.

FIGS. 5D, 5E, and 5F illustrate flowcharts for feature extraction according to embodiments of this disclosure. Feature extraction of FIGS. 5D, 5E, and 5F represent embodiments of the feature extractor 510 of FIGS. 5A, 5B, and 5C.

FIG. 5D illustrates the example feature extractor 510a according to an embodiment of this disclosure. The feature extractor 510a can be used in 11ay radar. As illustrated by the feature extractor 510a, the raw radar signals 505 are converted to RDM 512. That is, the feature extractor 510a generates the RDM 512 from the raw radar signals 505. Thereafter, the tap detector 514 identifies the region of interest in the RDM 512. The tap detection 514 selects the taps in the RDM 512. As such, the selected tap(s) correspond to the moving object. In certain embodiments, the tap detector 514 selects the tap(s) with the largest (or maximum) power in the in RDM 512.

After identifying the moving tap(s), the features can be calculated for each selected tap. That is, based on the selected tap(s) the feature extractor 510a generates the selected features. For example, the Doppler/velocity information is obtained based on the velocity vector 516, from RDM 512, for each corresponding tap. The velocity vector 516 across time (multiple frames) can form the TVD. The range information 518 can be based directly from the index of the detected taps. Beamforming 520 generates the Azimuth and Elevation angle feature 522 since the M pulses are corresponding to M TX-RX antennas pairs. It is noted that the Azimuth and Elevation information may include a significant amount of data, as such, an alternative method to finding the maximal power in beamforming 520 uses the corresponding Azimuth vector for Azimuth angle information and the corresponding Elevation vector for Elevation information. The micro Doppler feature 524 is obtained from the selected tap(s) based on the history of the RDM. The various features and information generated by the feature extractor 510a is outputted to the activity detector 540 and metrics 550 of FIG. 5A or the feature buffer 530 of FIGS. 5B and 5C. It is noted that not all the features (velocity vector 516, range information 518, azimuth and elevation angle feature 522, and micro Doppler 524) are needed.

In certain embodiments, the feature extractor 510a can omit finding various features due hardware limitations. For example, the feature extractor 510a can identify the velocity vector 516 feature (while not identifying the range information 518, azimuth and elevation angle feature 522, and the micro Doppler 524) as the input feature to a neural network. For another example, the feature extractor 510a can identify the velocity vector 516 feature and the azimuth and elevation angle feature 522 (which is generated by the beam forming 520) as input features to a neural network, while not identifying the range information 518 and the micro Doppler 524.

FIG. 5E illustrates the example feature extractor 510b according to an embodiment of this disclosure. The feature extractor 510b is similar to the feature extractor 510 and the feature extractor 510a; however the velocity vector 516 is obtained without the tap detector 514. To generate the velocity vector 516a of FIG. 5E, the feature extractor 510b selects the maximum power across different taps in a certain range for each Doppler/velocity value. The feature extractor 510b generates the velocity vector 516a by identifying the different maximum power across different taps, from the region of interest for each velocity component. The different maximum powers are combined to form the velocity vector 516a. For example, for each Doppler frequency (corresponding to each velocity), the feature extractor 510b selects the maximal power from all of the taps within a region of interest. All the selected values are used to form the velocity vector 516a. It is noted that velocity vector 516a not only includes the movement from the targeted object, but can also include other moving objects and noise within the region of interest.

In certain embodiments, the feature extractor 510b can omit finding identifying various features. For example, the feature extractor 510b can identify the velocity vector 516a feature (while not performing the tap detection, via the tap detector 514, and not identifying the range information 518, the azimuth and elevation angle feature 522, and the micro Doppler 524) as the input feature to a neural network.

FIG. 5F illustrates the example feature extractor 510c according to an embodiment of this disclosure. As illustrated, the tap detector 514a receives the raw radar signals 505. The tap detector 514a identifies taps in the CIR time domain signal. For example, the tap detector 514a selects the first tap with the CIR power above a predefined threshold. This selected tap is directly translated to the range information 518. A discrete Fourier transform 526 is performed on the select taps across bursts in each frame to generate the micro Doppler feature 524a and the velocity vector 516b. Beamforming 520 is performed on the selected tap to generate Azimuth and Elevation angle feature 522.

FIG. 5G illustrates a diagram of a sliding window 547 used by the activity detector 540 of FIG. 5A for activity detection according to embodiments of this disclosure. The area 545 corresponds to a region of interest that includes a gesture signature 546 over a period of time 548. The activity detector 540 can use a sliding window 547 to analyze the gesture signature 546. For example, the activity detector 540, using the sliding window 547, can identify the starting point and the ending point of the gesture based on the gesture signature 546.

FIG. 5H illustrates a block diagram of a neural network 560a for classifying gestures according to embodiments of this disclosure. As described above, the gesture classifier 560 of FIGS. 5A, 5B, and 5C recognizes the performed gesture based on the extracted features (via the feature extractor 510 of FIGS. 5A, 5B, and 5C). The gesture classifier 560 of FIGS. 5A, 5B, and 5C also recognizes the performed gesture based on the activity detector 540 of FIG. 5A, the gesture detector 542 of FIG. 5B, or the movement detector 544 of FIG. 5C.

In certain embodiments, the gesture classifier 560 is adaptive to each user since different users can perform the same predefined gesture differently. As such, the gesture classifier 560 collects data samples from each user to teach the neural network 560a to recognize varying gestures from specific user. For example, the neural network 560a can be used to encode the features of the processed RF data. In certain embodiments, a loss function (such as Angular-Softmax) that promotes both intra-class and inter-class distance is used by the neural network 560a.

For example, the encoder 562 can be trained to learn to differentiate different gestures. In certain embodiments, the encoder 562 can be used as the feature extractor to produce feature vectors from the processed radio frequency data. The feature vectors from the gesture signal will be precomputed and used along with the computed features from the sampled gesture signal to produce the similarity scores 564. The similarity scores 564 can be used to recognize the type of gesture.

In certain embodiments, the neural network 560a can include a threshold 566 to filter random (or invalid) gestures. Filtering random gestures removes gestures that are not trained and therefore not recognized by the neural network 560a. By comparing the similarity scores 564 to the threshold 566, the neural network 560a can determine to perform no action with respect to a gesture when the similarity score 564 is less than the threshold 566.

In certain embodiments, the neural network 560a can replace the precomputed features extracted from user collected gesture signals with precomputed features extracted from the centroids of the trained dataset. Using the centroids of the trained data removes the need to collect data samples from each user.

FIG. 5I illustrates a method 580 for gesture recognition according to embodiments of this disclosure. In particular, the method 580 corresponds to the signal processing diagram 500a of FIG. 5A. The method 580 is described as implemented by the electronic device 200 of FIG. 2, the electronic device 300 of FIG. 3A, or any one of the client devices 106-114 of FIG. 1, and server 104 of FIG. 1.

The process begins with the electronic device 200 transmitting radar signals via the radar transceiver 270. In step 582, the electronic device 200 via the radar transceiver 270, receives the reflected radar signals. The received radar signals can be similar to the raw radar signals 505 of FIGS. 5A-5F.

In step 584, the electronic device 200 performs the feature extraction. The feature extraction can be performed by the feature extractor 510 of FIGS. 5A, 5B, 5C, the feature extractor 510a of FIG. 5D, the feature extractor 510b of FIG. 5E, or the feature extractor 510c of FIG. 5F. In step 586, the extracted features are buffered by the feature buffer 530 of FIGS. 5A, 5B, and 5C.

In step 588, the electronic device 200, via the activity detector 540, determines whether there is an activity within the buffered extracted features. If no activity is detected or identified the method returns to step 582. When the activity detector 540 detects an activity, the electronic device, via gesture classifier 560 of FIGS. 5A, 5B, 5C, classifies the gesture in step 590. In step 592, the gesture classifier 560 determines whether the gesture is a desired gesture. If the gesture is not a desired gesture (such that the gesture does not perform any action) then method returns to step 582.

When the gesture is a desired gesture, in step 594, the electronic device calculates the various metrics via the metrics 550 of FIG. 5A.

In step 596, the electronic device, via the logical gate 570, determines whether the gesture corresponds to the calculated metrics. For example, the logical gate 570 confirms whether the identified gesture corresponds to the calculated metrics (based on comparing the metrics to thresholds). If the identified gesture does not correspond to the calculated metrics, then the method returns to step 582. When the identified gesture corresponds to the calculated metrics, an output (similar to the output 575 of FIGS. 5A, 5B, and 5C) is generated in step 598. The output instructs the electronic device 200 to perform an action based on the identified gesture. In step 599 the electronic device resets the feature buffer 530 of FIG. 5A.

Although FIGS. 5A-5I illustrates various aspects of processing radar signals, various changes may be made to the FIGS. 5A-5I. For example, while shown as a series of steps, various steps could overlap, occur in parallel, or occur any number of times.

Figure 6:
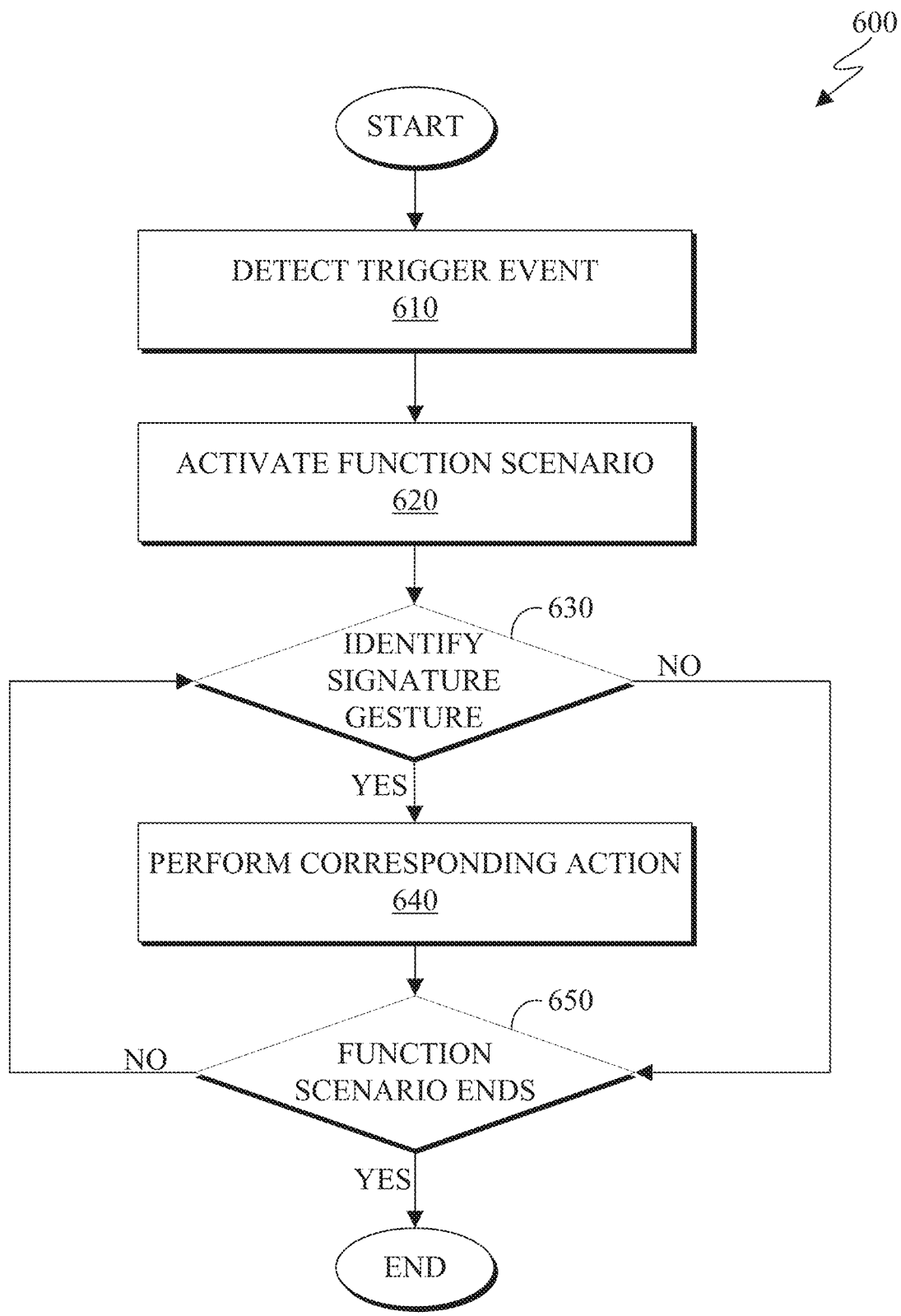
FIG. 6 illustrates an example method for gesture recognition according to embodiments of this disclosure.

FIG. 6 illustrates an example method 600 for gesture recognition according to embodiments of this disclosure. It is noted that the method 600 corresponds to the electronic device 200 performing an action in response to identifying a signature gesture. The method 600 is described as implemented by the electronic device 200 of FIG. 2, the electronic device 300 of FIG. 3A, or any one of the client devices 106-114 of FIG. 1, and server 104 of FIG. 1. For ease of explanation the method 600 is described as being performed by the electronic device 200 of FIG. 2.

In step 610, the electronic device 200 detects a triggering event. In certain embodiments, the electronic device 200 detects multiple triggering events in step 610. The triggering event is an event that triggers the gesture recognition process. For example, the triggering event can be an incoming phone call. For instance, if the electronic device 200 is a smart phone, receiving a phone call corresponds to a triggering event of step 610. For another example, the triggering event can be an application, such as one of the applications 262 of FIG. 2, being executed or running on the electronic device 200. For yet another example, the triggering event can be the electronic device 200 detecting an input through a button. For instance, the button could initiate the virtual personal assistant. For another example, the triggering event can be the electronic device 200 connecting to another device, such as an automobile through BLUETOOTH. The triggering event can include the electronic device 200 determining that it is being moved in a certain predefined patter. For instance, a gyroscopic sensor (such as the sensor 265 of FIG. 2) detects motion and the electronic device 200 determines whether the motion matches a predefined pattern. The motion corresponds the triggering event of step 610 when the motion matches a predefined pattern.

After the electronic device 200 detects the triggering event of the step 610, the electronic device activates a function scenario in step 620. The function scenario includes the radar transceiver 270 of FIG. 2 emitting radar signals and receiving reflected radar signals. The received radar signals can be similar to the raw radar signals 505 of FIGS. 5A-5F. In certain embodiments, the function scenario can change based on a particular triggering event of the step 610 that is detected. If the triggering event of step 610 is an incoming phone call, then the function scenario of step 620 is associated with controlling the phone call. For example, the function for answering the phone call or rejecting the phone call is activated. If the triggering event is a music application, then the function for controlling the music playback is activated. The gestures for controlling phone call and the gestures for controlling music playback can differ.

In step 630, the electronic device determines whether a signature gesture that corresponds to either answering the phone call or rejecting the phone call is identified from the reflected radar signals. The radar signals are emitted and received via the radar transceiver 270 of FIG. 2. If the signature gesture corresponding to one of the function scenarios is not identified from the raw radar signals that are received, then the function scenario ends is step 650. The function scenario can end after a predefined time period.

Alternatively, if the identified signature gesture corresponding to one of the function scenarios then, then at step 640, the electronic device 200 performs the action corresponding to the signature gesture. For example, if the electronic device 200 identifies a push pull gesture (similar to the gesture 410 of FIG. 4B) or a pull push (similar to the gesture 415 of FIG. 4B) then the electronic device 200 answers the phone call. Alternatively, if the electronic device 200 identifies a wave gesture (similar to the gestures 430 or 435 of FIG. 4B) then the electronic device 200 rejects the phone call.

In certain embodiments, the function scenario can be scrolling. As such, a signature gesture such as the gestures 420 and 425 of FIG. 4B can correspond to an action of scrolling up or down while the signature gesture such as the gestures 430 and 435 of FIG. 4B can correspond to an action of scrolling left or right.

After performing the action in step 640, the electronic device 200 determines whether the function scenario ends in step 650. If the function scenario does not end, such as when a subsequently identified signature gesture indicates another action is to be performed, the method 600 returns to step 630. With respect to the previous example of the triggering event of step 610 being an incoming phone call and the first identified signature of step 630 being a push pull gesture to answer the phone call, then the second identified signature gesture of step 630 could be a wave gesture corresponding to hanging up or ending the answered phone called. Once the second identified gesture is detected, at step 630, then the electronic device 200 performs the corresponding action, such as ending the phone call, at step 640. When the electronic device 200 determines that the function scenario ends at step 650, such as after a predetermined time, the method 600 concludes. It is noted that the method 600 can return to step 610 when a new triggering event is detected.

Although FIG. 6 illustrates one example for gesture recognition various changes may be made to FIG. 6. For example, while shown as a series of steps, various steps in FIG. 6 could overlap, occur in parallel, or occur any number of times.

Figure 7A:
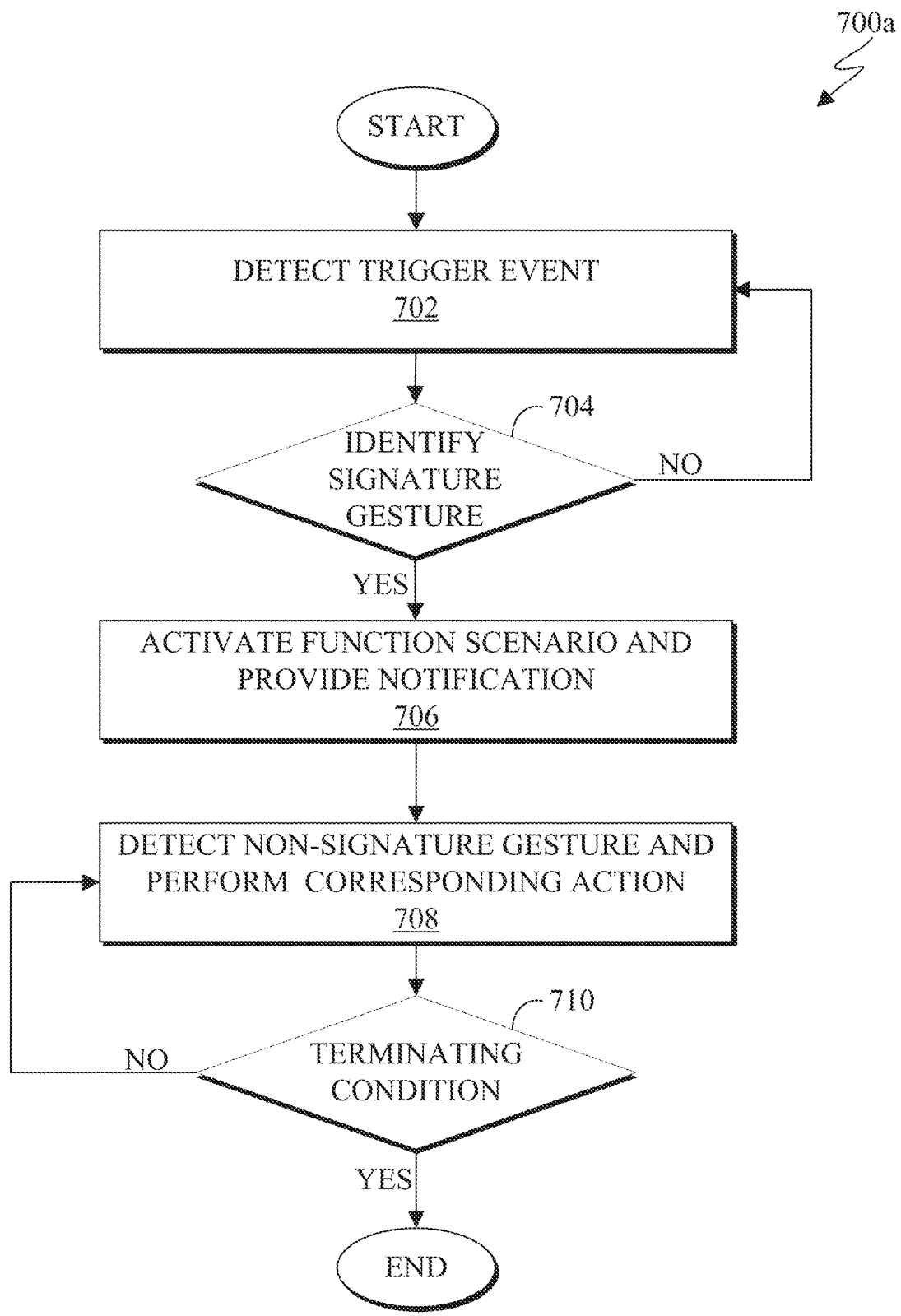
FIGS. 7A and 7B illustrates an example method for gesture recognition with feedback according to embodiments of this disclosure.
Figure 7B:
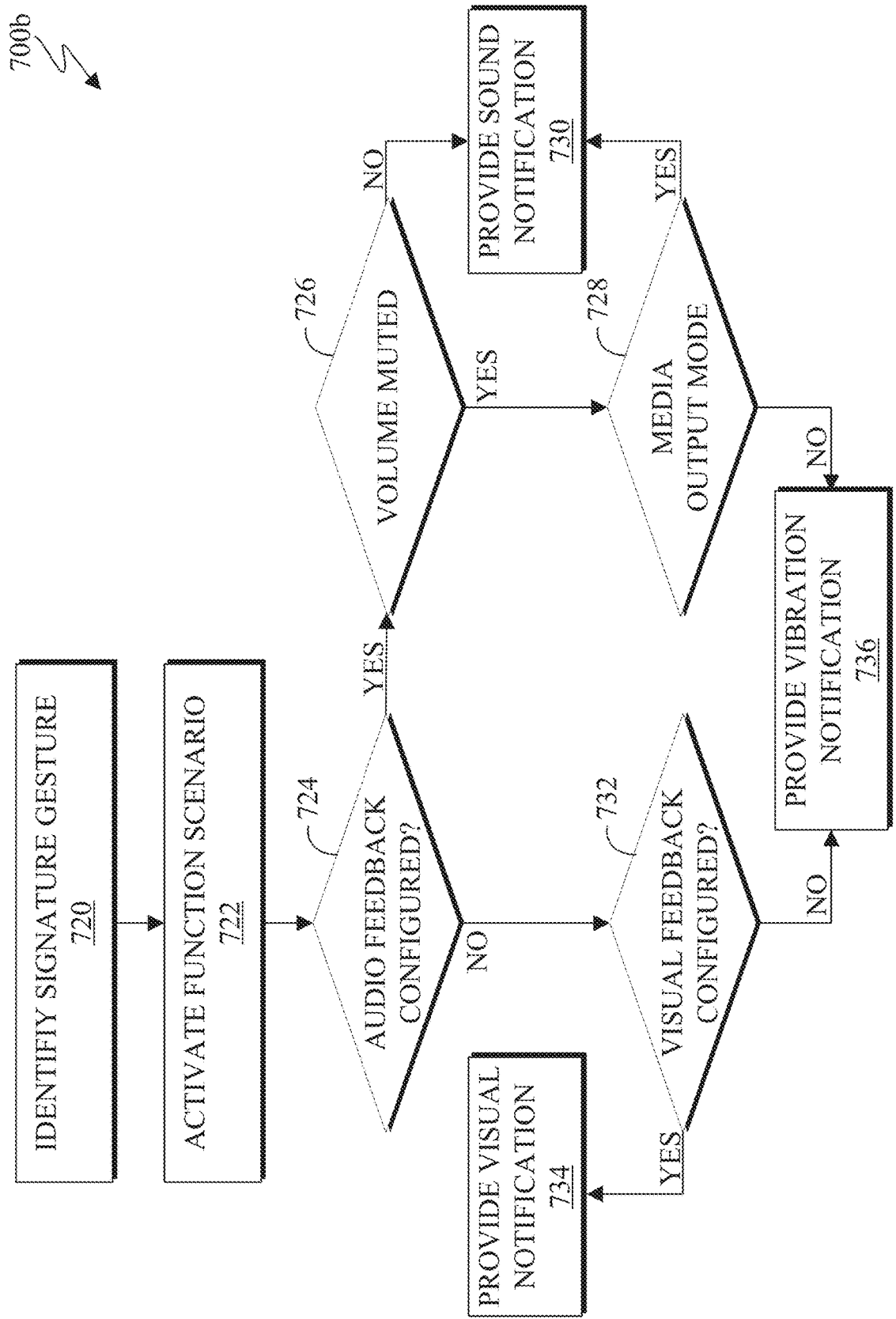

FIGS. 7A and 7B illustrate an example method for gesture recognition with feedback according to embodiments of this disclosure. In particular, the FIG. 7A illustrates a method 700a where the action is performed in response to receiving non-signature gesture. It is noted that method 700a corresponds to the electronic device 200 of FIG. 2 performing the action based on a non-signature gesture that is received in response to receiving a signature gesture, while the method 600 of FIG. 6 corresponds to the electronic device 200 performing a direct action in response to identifying a signature gesture. FIG. 7B illustrates a method 700b describing a flow of generating a notification to the user. The notification specifies to the user as to when to perform the non-signature gesture. The methods 700a and 700b are described as implemented by the electronic device 200 of FIG. 2, the electronic device 300 of FIG. 3A, or any one of the client devices 106-114 of FIG. 1, and server 104 of FIG. 1. For ease of explanation the methods 700a and 700b are described as being performed by the electronic device 200 of FIG. 2.

In FIG. 7A the method 700a detects a triggering event in step 702. Detecting a triggering event in step 702 can be similar to detecting the triggering event of step 610 of FIG. 6. After detecting the triggering event in step 702, the electronic device 200 emits radar signals and receives reflected radar signals, via the radar transceiver 270 of FIG. 2. The received radar signals can be similar to the raw radar signals 505 of FIGS. 5A-5F.

In step 704, the electronic device 200 determines whether a signature gesture is identified from the received radar signals. If no signature gesture is identified, then the method 700a returns to step 702 to detect another triggering event. In certain embodiments, the method 700a waits a period of time to identify the signature gesture before returning to step 702. The signature gesture can be one of the gestures described in FIG. 4B.

When a signature gesture is identified in step 704, the electronic device 200 activates a function scenario and provides a notification in step 706. The function scenario includes the radar transceiver 270 of FIG. 2 emitting and receiving additional radar signals for identifying a non-signature gesture. The emitted and received radar signals can be similar to the radar signals that were emitted and received after detecting the triggering event in step 702. The received radar signals can be similar to the raw radar signals 505 of FIGS. 5A-5F. In certain embodiments, the function scenario can change based on a particular triggering event of the step 702 that is detected, the identified signature gesture, or a combination thereof. The process of providing a notification is described in greater detail in FIG. 7B, below.

In step 708, the electronic device identifies a non-signature gesture and performs an action based on the identified non-signature gesture. The non-signature gesture can be one of the gestures described in FIG. 4C.

The electronic device 200 can continue identifying gestures and performing the actions with respect to non-signature gestures until identifying a terminating condition in step 710. For example, after the electronic device 200 identifies a non-signature gesture and performs the corresponding action indicated by the gesture, the electronic device 200 determines whether a terminating condition occurred. When no terminating condition occurred, then the electronic device 200 can continue to detect and identify gestures and perform corresponding actions with respect to identified non-signature gestures. Alternatively, when a terminating condition occurs, the method 700a concludes.

In certain embodiments, the terminating condition can be based on a time period. For example, a timer can commence from the start of the function scenario activation, and upon an expiration of a predetermined time, causes the termination condition to occur. In certain embodiments, the terminating condition can be based on the identified gesture. For example, the termination condition can occur if the gesture is too minor. For another example, the termination condition can occur if the gesture does not pass positive detection criteria. For yet another example, the termination condition can occur if the gesture is too minor and the gesture does not pass the positive detection criteria for a predefined time duration.

FIG. 7B describes the method 700b describing a flow of generating a notification to the user. At step 720, the electronic device 200 identifies a signature gesture. The step 720 occurs after determining whether a signature gesture is identified in step 704 of FIG. 7A. The method 700b describes that the electronic device 200 provides a visual notification via a display (such as the display 255 of FIG. 2), an audio notification via a speaker (such as the speaker 230 of FIG. 2), or vibrate. The notification informs the user that a signature gesture is identified and to perform a non-signature gesture.

After identifying the signature gesture (of step 720) the electronic device 200 activates the function scenario in step 722. The function scenario can be similar to the function scenario of step 706 of FIG. 7A. Moreover, the steps 724 through 736 describe the notification process and can be included in the step 706 of FIG. 7A.

In step 724, the electronic device 200 determines whether audio feedback is configured. Audio feedback is configured when the electronic device is enabled to provide an audible notification. Upon determining that the audio feedback is configured, the electronic device in step 726, determines whether the audio is muted. If the audio is not muted, then in step 730, the electronic device 200 provides an audio notification to the user. The audio notification can instruct the user to perform a non-signature gesture.

If it is determined, in step 726, that the volume is muted, then in step 728 the electronic device 200 determines whether the electronic device 200 is currently in a media output mode. A media output mode indicates that the electronic device 200 is currently reproducing visual or audio media, such as playing music or playing a video. If the electronic device 200 is in a media output mode, such as when the electronic device is playing music, the electronic device 200 provides an audio notification to the user in step 730. If the electronic device is not in a media output mode, then in step 736, the electronic device 200 provides a vibration notification. For example, when the electronic device 200 is both muted and not outputting any media content, then the electronic device 200 notifies the user to perform a non-signature gesture by vibrating. The vibrations notify the user that the signature gesture of step 720 is identified and that the electronic device 200 is ready to identify a non-signature gesture.

If in step 724 it is determined that the audio feedback is not configured, then the electronic device 200 determines whether visual feedback is configured, in step 732. Visual feedback is configured when the electronic device is enabled to display a notification on the display 255. When the visual feedback is not configured, then in step 736, the electronic device 200 provides a vibration notification. For example, when the audio feedback and visual feedback are not configured, the electronic device 200 can notify the user to perform a non-signature gesture by vibrating. The vibrations notify the user that the signature gesture of step 720 is identified and that the electronic device 200 is ready to identify a non-signature gesture. When the visual feedback is configured, the electronic device 200 provides a visual notification to the user in step 734. The visual notification can be a message that is displayed on the display 255 of FIG. 2, informing the user to perform a non-signature gesture.

Although FIGS. 7A and 7B illustrates one example for gesture recognition various changes may be made to FIGS. 7A and 7B. For example, while shown as a series of steps, various steps in FIGS. 7A and 7B could overlap, occur in parallel, or occur any number of times.

Figure 8:
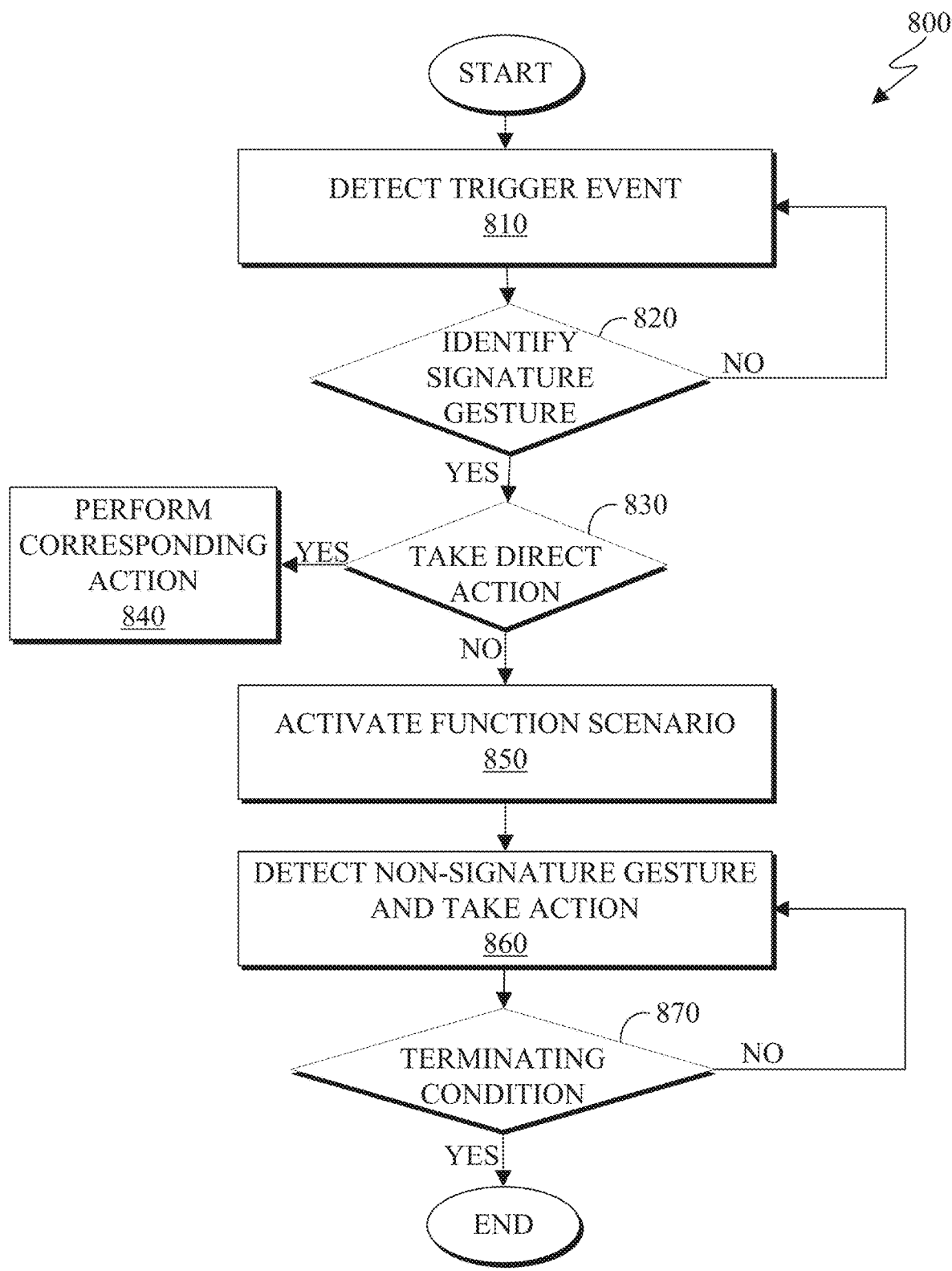
FIG. 8 illustrates and example method for gesture recognition according to embodiments of this disclosure.

FIG. 8 illustrates and example method 800 for gesture recognition according to embodiments of this disclosure. It is noted that the method 800 corresponds to a combination of the method 600 of FIG. 6 and the method 700a of FIG.

7A. For example, the method 800 describes that based on the particular identified signature gestures the electronic device 200 will either perform an action indicated by the signature gesture or identify a non-signature gesture and perform the action indicated by the non-signature gesture. The method 800 is described as implemented by the electronic device 200 of FIG. 2, the electronic device 300 of FIG. 3A, or any one of the client devices 106-114 of FIG. 1, and server 104 of FIG. 1. For ease of explanation the method 800 is described as being performed by the electronic device 200 of FIG. 2.

In step 810, the electronic device 200 detects a triggering event. Detecting a triggering event in step 710 can be similar to detecting the triggering event of step 610 of FIG. 6 and step 702 of FIG. 7A. After detecting the triggering event in step 810, the electronic device 200 emits and receives radar signals via the radar transceiver 270 of FIG. 2. The received radar signals can be similar to the raw radar signals 505 of FIGS. 5A-5F.

In step 820, the electronic device 200 determines whether a signature gesture is identified from the raw radar signals that are received via the transceiver 270. The signature gesture can be one of the gestures described in FIG. 4B. After identifying the signature gesture from the received radar signals, the electronic device 200 determines whether the identified signature gesture corresponds to an action that the electronic device 200 is to perform in step 840. When the signature gesture corresponds to an action, then in step 840 the electronic device 200 performs the action. Performing an action based on a signature gesture is similar to the method 600 of FIG. 6.

Alternatively, when the signature gesture does not correspond to an action, then in step 840 the electronic device 200 activates a function scenario in step 850. In certain embodiments, when the function scenario of step 850 is activated, the electronic device can generate a notification to notify the user to perform a non-signature gesture. Generating the notification can be similar to the method 700b of FIG. 7B. In step 860, the electronic device 200 identifies a non-signature gesture and subsequently performs an action indicated by with the non-signature gesture. The non-signature gesture can be one of the gestures described in FIG. 4C.

The electronic device 200 can continue identifying non-signature gestures and performing the actions indicated by the non-signature gestures until a terminating condition of step 870 is identified. The terminating condition can be similar to the terminating conditions of step 710 of FIG. 7A.

Although FIG. 8 illustrates one example for gesture recognition various changes may be made to FIG. 8. For example, while shown as a series of steps, various steps in FIG. 8 could overlap, occur in parallel, or occur any number of times.

Figure 9:
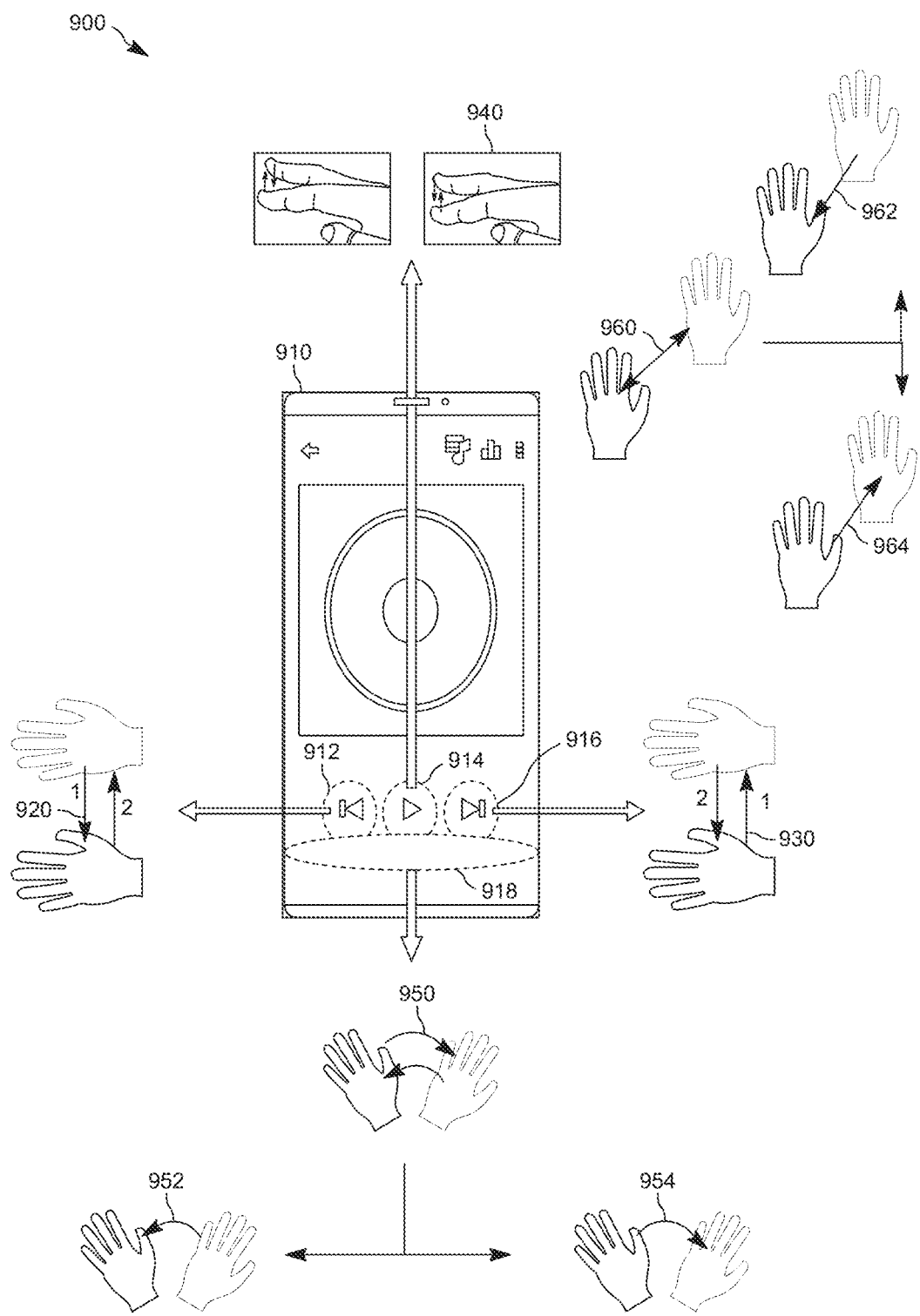
FIG. 9 illustrates and example embodiment for using gestures according to embodiments of this disclosure.

FIG. 9 illustrates and example embodiment 900 for using gestures according to embodiments of this disclosure. For example, the embodiment 900 describes an electronic device 910 identifying signature gestures and non-signature gestures and performing actions according to the particular identified gesture. The electronic device 910 is similar to the electronic device 200 of FIG. 2, the electronic device 300 of FIG. 3A, or any one of the client devices 106-114 of FIG. 1, and server 104 of FIG. 1.

The electronic device 910 can include a touch display. As such the user can control the electronic device by simply touching one of the icons 912, 914, 916, and 918. As illustrated, the electronic device 910 is executing a music application (such as one of the applications 262 of FIG. 2). The music application includes various user interface buttons for controlling the playback of the music. When the user interacts with any of the icons 912, 914, 916, and 918, the electronic device will perform a particular action. For example, upon activating the icon 912, the electronic device 910 will re-start a currently playing song at the begging of the song or start play the previous song. Upon activating the icon 916, the electronic device 910 will play the next song in the queue. Upon activating the icon 914, the electronic device 910 will pause or play the music. For example, if the music is paused or not currently being played, by activating the icon 914, the electronic device 910 will play the music. If the music is currently playing, by activating the icon 914, the electronic device 910 will execute an action that pauses the music. The icon 918 represents a scroll bar that when slide changes the current portion of the media that is being reproduced. For example, by sliding the scroll bar the user can fast-forward or replay a portion of the currently playing song. Moving the scroll bar to the right moves the portion of the song that is being reproduced to a future portion. Similarly, moving the scroll bar to the left replays a portion of the song that was previously reproduced.

According to embodiments of the present disclosure, the electronic device 910 can identify gestures performed by the user and based on the identified gesture perform the same action as if the user touched one of the icons 912, 914, 916, and 918. It is noted that the gestures described in the embodiment 900 are for example purposes only. The described gestures are not limited to performing the particular actions as illustrated.

The triggering event of steps 610, 702, and 810 of FIGS. 6, 7A, and 8, respectively, can be the running of the music application. When the music application is running the electronic device 910 identifies either a signature gesture, such as the gestures described in FIG. 4B or a non-signature gesture, such as the gestures described in FIG. 4C.

Upon identifying a particular signature gesture the electronic device 910 will perform an action such as replay the previous song (such as if the electronic device 910 detects a user input on the icon 912) or activate a function scenario and perform an action based on identifying a non-signature gesture. For example, when the electronic device 910 identifies the signature gesture 920, similar to the gesture 420 of FIG. 4B corresponding to a swipe down up gesture, the electronic device 910 performs an action that replays the previous song (such as if the electronic device 910 detects a user input on the icon 912). When the electronic device 910 identifies the signature gesture 930, similar to the gesture 425 of FIG. 4B corresponding to a swipe up down gesture of FIG. 4B, the electronic device 910 performs an action that plays the next song in the queue (such as if the electronic device 910 detects a user input on the icon 916). When the electronic device identifies the signature gesture 940, similar to the gesture 440 and 445 of FIG. 4B representing finger drumming of FIG. 4B, the electronic device 910 performs an action that pauses the media when the media is currently playing or plays the music when the media is currently paused (such as if the electronic device 910 detects a user input on the icon 914).

A function scenario is activated when the electronic device 910 identifies the signature gesture 950 (similar to the gestures 430 and 435 of FIG. 4B corresponding to a swipe right left gesture and a swipe left right gesture) or 960 (similar to the gestures 410 and 415 of FIG. 4B corresponding to a push pull gesture or a pull push gesture). When the signature gesture 950 (corresponding to swipe right left gesture and a swipe left right gesture) is identified, the electronic device 910 activates a function scenario associated the icon 918, corresponding to fast forwarding or rewinding the media that is currently playing. After the function scenario associated the icon 918 is activated and the electronic device 910 identifies a gesture 952 (similar to the gestures 475 of FIG. 4C corresponding to a swipe left right gesture), the action performed by the electronic device 910 rewinds the media. Similarly, after the function scenario associated the icon 918 is activated and the electronic device 910 identifies a gesture 954 (similar to the gestures 470 of FIG. 4C corresponding to a swipe right left gesture), the action performed by the electronic device fast forwards the media.

When the gesture 960 (corresponding to push pull gesture or a pull push gesture) is identified, the electronic device 910 activates a function scenario associated with the volume, After the function scenario associated with the volume is activated and the electronic device 910 identifies a gesture 962 (similar to the gestures 455 of FIG. 4C corresponding to a pull gesture), the action performed by the electronic device reduces the volume of the media. Similarly, after the function scenario associated with the volume is activated and the electronic device 910 identifies a gesture 964 (similar to the gestures 450 of FIG. 4C corresponding to a push gesture), the action performed by the electronic device increases the volume of the media.

Although FIG. 9 illustrates various aspects of controlling an electronic device 910 via gestures various changes can be made to FIG. 9. For example, the described gestures and their corresponding actions are for example purposes only. Different gestures can be used to correspond to different actions when controlling media. As such, FIG. 9 does not limit this disclosure to any particular gestures or actions.

Figure 10:
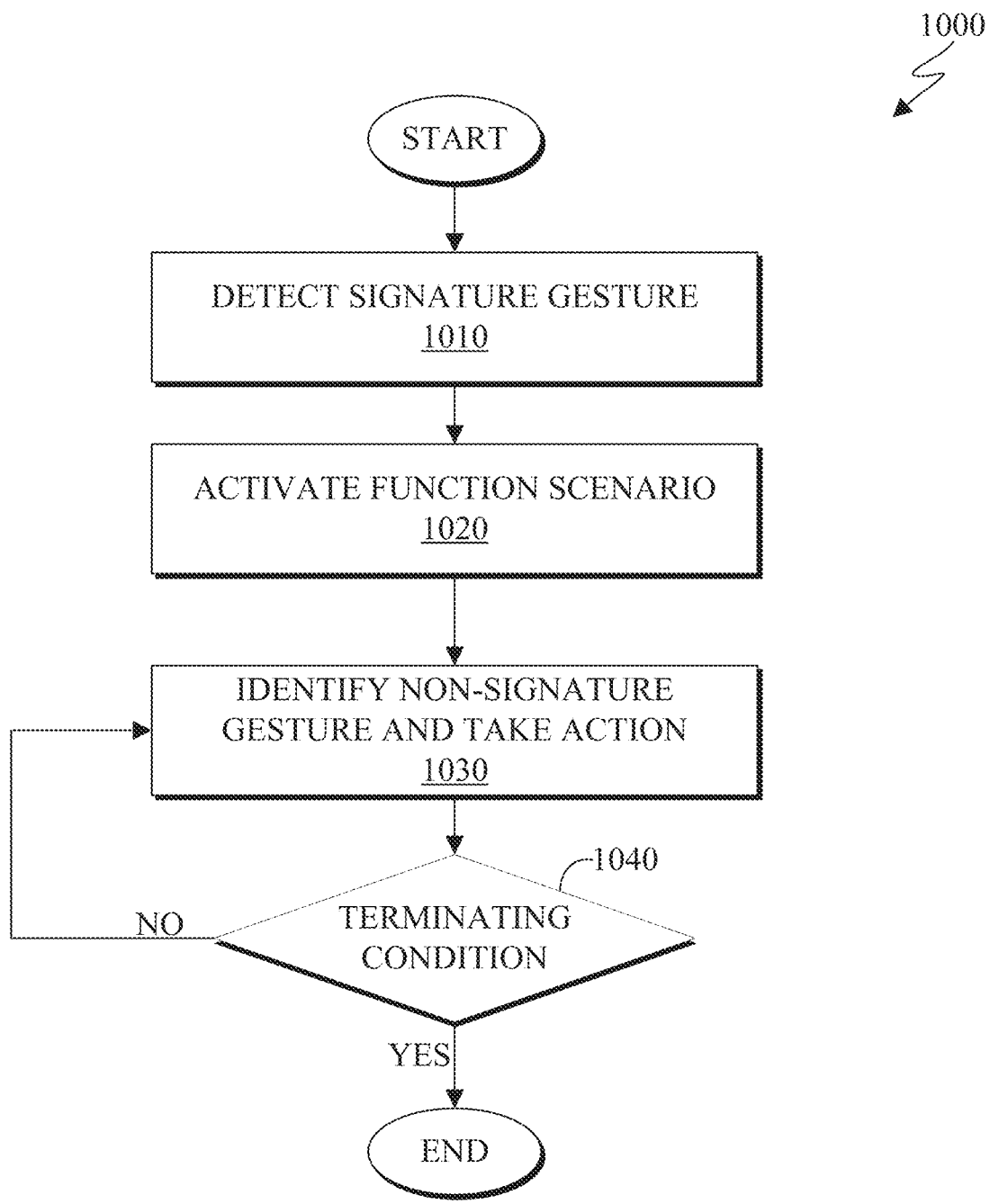
FIG. 10 illustrates an example method for gesture recognition according to embodiments of this disclosure.

FIG. 10 illustrates an example method 1000 for gesture recognition according to embodiments of this disclosure. The method 1000 corresponds to a triggering event that activates a function scenario associated with non-signature gestures. The method 1000 is described as implemented by the electronic device 200 of FIG. 2, the electronic device 300 of FIG. 3A, or any one of the client devices 106-114 of FIG. 1, and server 104 of FIG. 1. For ease of explanation the method 1000 is described as being performed by the electronic device 200 of FIG. 2.

In step 1010, the electronic device 200 identifies a signature gesture. For example, the electronic device 200 emits and receives radar signals via the radar transceiver 270 of FIG. 2. The received radar signals can be similar to the raw radar signals 505 of FIGS. 5A-5F. When the received radar signals identify a signature gesture, the electronic device 200 activates a function scenario in step 1020.

When the function scenario is activated, the electronic device 200 again emits and receives radar signals via the radar transceiver 270 of FIG. 2. The received radar signals can be similar to the raw radar signals 505 of FIGS. 5A-5F. In step 1030, the electronic device identifies a non-signature gesture (such as one of the gestures described in FIG. 4C, above) from the received radar signals and performs the action associated with the identified gesture.

The electronic device 200 can continue identifying non-signature gestures and performing the actions indicated by the non-signature gestures until a terminating condition of step 1040 is identified. The terminating condition can be similar to the terminating conditions of step 710 of FIG. 7A and of step 870 of FIG. 8.

For example, when the user is wearing gloves and desires to adjust the brightness of the screen of the electronic device, the user can trigger a virtual personal assistant that is a component of the electronic device. The user can trigger the virtual personal assistant by pressing a button on the electronic device 200 or by speaking a keyword that the virtual personal assistant is passively listening for. Once the virtual personal assistant is actively listening to the user, the user can verbally speak to the virtual personal assistant and request to change the brightness. Thereafter the user can perform a non-signature gesture such as a swipe right (similar to the gesture 740 of FIG. 4C) to increase the brightness of the screen or swipe left (similar to the gesture 475 of FIG. 4C) to decrease the brightness of the screen. The user can continually perform the swipe left or swipe right until the desired brightness level is obtained. Upon determining that the predetermined time associated with the terminating condition elapsed, the electronic device can stop emitting radar signals or stop identifying gestures from the received raw radar signals.

Although FIG. 10 illustrates one example for gesture recognition various changes may be made to FIG. 10. For example, while shown as a series of steps, various steps in FIG. 10 could overlap, occur in parallel, or occur any number of times.

Figure 11:
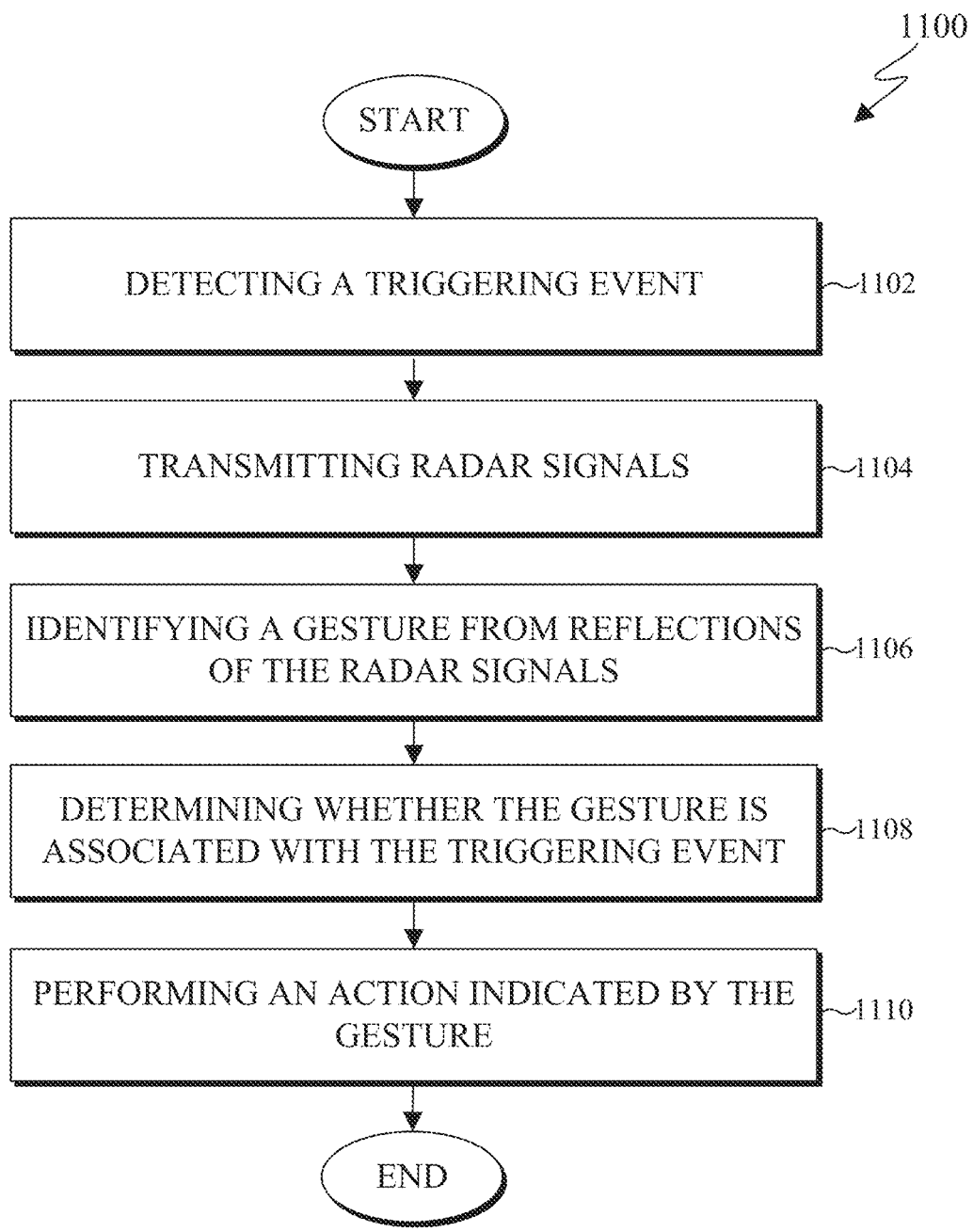
FIG. 11 illustrates an example method for gesture recognition according to embodiments of this disclosure.

FIG. 11 illustrates an example method 1100 for gesture recognition according to embodiments of this disclosure. The method 1100 corresponds to an event that triggers a non-signature gesture. The method 1000 is described as implemented by the electronic device 200 of FIG. 2, the electronic device 300 of FIG. 3A, or any one of the client devices 106-114 of FIG. 1, and server 104 of FIG. 1. For ease of explanation the method 1100 is described as being performed by the electronic device 200 of FIG. 2.

In step 1102, the electronic device 200 detects a triggering event. In certain embodiments, the electronic device 200 detects a two or more triggering events. The triggering event is an event that triggers the gesture recognition process.

For example, the triggering event can be an incoming phone call. For instance, if the electronic device 200 is a smart phone and receives a phone call, then the electronic device also detects the triggering event of step 610. For another example, the triggering event can be an application, such as one of the applications 262 of FIG. 2, being executed or running on the electronic device 200. For instance, the triggering event can be the music application as described above in FIG. 9. The triggering event can be the user activating the virtual personal assistant. For yet another example, the triggering event can be the electronic device 200 detecting an input through a button. For instance, the button could initiate the virtual personal assistant. For another example, the triggering event can be the electronic device 200 connecting to another device, such as an automobile through BLUETOOTH. The triggering event can include the electronic device 200 determining that it is being moved in a certain predefined patter. For instance, a gyroscopic sensor (such as the sensor 265 of FIG. 2) detects motion and the electronic device 200 determines whether the motion matches a predefined pattern. If the motion matches a predefined pattern then the electronic device 200 detects the triggering event of step 610.

In step 1104, the electronic device 200 emits radar signals and receives radar signals that reflected off of a target object via a radar transceiver, such as the radar transceiver 270 of FIG. 2. After the reflected radar signals are received, the electronic device 200, in step 1106, identifies a gesture from the reflected radar signals. To identify the gesture, the electronic device 200 extracts features from the reflected radar signals. In certain embodiments, the features are within a Doppler domain, a velocity domain, a range domain, or a combination thereof. For example, the extracted features can include a TVD, which indicates a radial velocity between the radar transceiver and the target object (such as the hand of the user that is performing the gesture). The electronic device 200 identifies TVD based on the maximum power. Additionally, the electronic device 200 can classify the gesture from the TVD.

The electronic device 200 an also identify movement associated with the gesture from the identified features. Thereafter the electronic device 200 classifies the gesture based on the identified movement. The gesture can be classified between an invalid gesture and a signature gesture. The gesture can also be classified between an invalid gesture and a non-signature gesture. In certain embodiments, the electronic device 200 includes a neural network that classifies the gesture.

After identifying the gesture, the electronic device 200 confirms that the identified gesture is within to a set of thresholds in order to confirm the identified gesture. The electronic device 200 identifies the distance between the radar transceiver and the target object (such as the hand of the user that is performing the gesture). The electronic device 200 also identifies a Doppler shift range and an angle shift range. The electronic device compares the distance to a first threshold, the Doppler shift range to a second threshold, and the angle shift range to a third threshold. Based on the comparison the electronic device 200 can confirm whether the gesture is a signature gesture of an invalid gesture.

When the identified gesture is a signature gesture, the electronic device 200 in step 1108, determines whether the signature gesture is associated with the triggering event. For example, if the triggering event is a phone call, and a signature gesture, (such as the gesture 410 of FIG. 4B) that corresponds to an input for accepting the phone call is identified, then the electronic device 200 determines that the gesture is associated with the triggering event. Similarly, if the triggering event is a phone call, and a signature gesture (such as the gesture 430 of FIG. 4B) that that corresponds to an input for rejecting the phone call is identified, then the electronic device 200 determines that the gesture is associated with the triggering event. However, if the triggering event is a phone call, and certain signature gesture (such as the gestures 420 and 440, of FIG. 4B) that do not correspond to an input are identified, then the electronic device 200 determines that the gesture is not associated with the triggering event, and therefore no action is performed. After determining that the signature gesture is associated with the triggering event, the electronic device 200 performs the action indicated by the gesture, in step 1110. Alternatively, when the identified signature gesture is not associated with the triggering event, the electronic device does not perform an action.

When the identified gesture of step 1108 is a non-signature gesture, then the electronic device 200 identifies a signature gesture from the received radar reflections before the identifying the non-signature gesture. Based on identifying the signature gesture, the electronic device 200 determines that the non-signature gesture performs an action indicated by the non-signature gesture. That is, the electronic device 200 first identifies a signature gesture that is not associated with the triggering event, and then identifies a non-signature gesture which that indicates the action to be performed by the electronic device. After identifying the non-signature gesture, the electronic device determines whether the non-signature gesture is associated with the triggering event (in step 1108). After determining that the non-signature gesture is associated with the triggering event, the electronic device 200 performs the action indicated by the non-signature gesture, in step 1110. It is noted that the signature gesture includes a repetition in the feature domain, while the non-signature gesture does not repeat in the feature domain. Repeating can include a gesture that is flipped.

In certain embodiments, the electronic device 200 identifies multiple non-signature gesture after a signature gesture is identified, in step 1106. Thereafter, the electronic device 200 performs an action indicated by each of the identified non-signature gestures.

After the signature gesture is identified, the electronic device 200 can generate a notification to notify the user to perform a non-signature gesture. For example, the notification notifies the user that the electronic device 200 will perform the action indicated by the non-signature gesture.

When the identified gesture of step 1108 is a first signature gesture, then the electronic device 200 can identify a second signature gesture based on transmitting additional radar signals and receiving additional radar reflections. For example, the electronic device 200 can determine that the first signature gesture is associated with the triggering event and thereafter perform the action indicated by the first signature gesture. Thereafter, the electronic device can continue transmitting radar signals and receiving radar reflections in order to identify the second signature gesture. Upon identifying the second signature gesture, the electronic device can generate a notification. The notification indicates that the electronic device 200 will perform an action indicated by a subsequently identified non-signature gesture. Thereafter, the electronic device 200 can continue transmitting radar signals and receiving radar reflections in order to identify the non-signature gesture. After identifying the non-signature gesture, the electronic device 200 then performs the action indicated by the non-signature gesture.

Although FIG. 11 illustrates one example for gesture recognition various changes may be made to FIG. 11. For example, while shown as a series of steps, various steps in FIG. 11 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device for gesture recognition, the electronic device comprising:
   a radar transceiver; and
   a processor operably connected to the radar transceiver, the processor configured to:
     detect a triggering event,
     in response to detecting the triggering event, transmit, via the radar transceiver, radar signals,
     classify a gesture from reflections of the radar signals received by the radar transceiver, wherein the gesture is classified as (i) a first gesture type when the gesture includes at least one repetition in a feature domain, (ii) a second gesture type when the gesture is not repeating in the feature domain, and (iii) an invalid gesture when the gesture is not classified as the first gesture type or the second gesture type, when the gesture is not invalid identify the gesture based on a comparison of an angle shift to a first threshold and a power level change to a second threshold, determine whether the gesture indicating a potential action is associated with the triggering event, and in response to determining that the gesture is associated with the triggering event, perform an action indicated by the gesture, and in response to determining that the gesture is not associated with the triggering event, do not perform the action indicated by the gesture, wherein the feature domain includes at least one of Doppler, velocity, angle, and range.

2. The electronic device of claim 1, wherein:

the radar transceiver is a mono-static radar transceiver configured to transmit the radar signals in pulses and receive reflections of the radar signals; and the processor is further configured to:

identify that the gesture is a signature gesture, the signature gesture corresponding to the first gesture type, and based on identifying that the gesture is the signature gesture and associated with the triggering event, the processor is further configured to perform the action indicated by the signature gesture, wherein the at least one repetition includes motion that is repeated in a similar direction or motion that is repeated in a reverse direction.

3. The electronic device of claim 2, wherein after identifying that the signature gesture is not associated with the triggering event, the processor is further configured to:

identify one or multiple non-signature gestures based on reflections of the radar signals received by the radar transceiver, the non-signature gestures corresponding to the second gesture type; and perform different actions corresponding to the one or multiple non-signature gestures until a termination condition is detected.

4. The electronic device of claim 1, wherein:

the gesture is a non-signature gesture that corresponds to the second gesture type; and the processor is configured to:

before identifying the non-signature gesture, identify a signature gesture based on reflections of the radar signals received by the radar transceiver, the signature gesture corresponding to the first gesture type, and based on identifying the signature gesture, determine to allow the non-signature gesture to perform the action on the electronic device.

5. The electronic device of claim 4, wherein after identifying the signature gesture, the processor is configured to generate a notification indicating that the non-signature gesture performs the action on the electronic device.

6. The electronic device of claim 1, wherein:

the gesture is a first signature gesture that corresponds to the first gesture type; and the processor is configured to:

identify, based on reflections of the radar signals received by the radar transceiver, a second signature gesture that does not correspond with any action for the electronic device to perform, the second signature gesture corresponding to the first gesture type, generate a notification indicating that a non-signature gesture controls the electronic device, the non-signature gesture corresponding to the second gesture type, identify, based on reflections of the radar signals received by the radar transceiver, the non-signature gesture, and perform another action indicated by the non-signature gesture.

7. The electronic device of claim 1, wherein to identify the gesture from the reflections, the processor is configured to:

extract a feature from the reflections;

identify, from the feature, movement associated with the gesture;

classify the gesture based on the movement, wherein, to classify the gesture, the processor is configured to:

distinguish the gesture between the invalid gesture and the first gesture type, or distinguish the gesture between the invalid gesture and the second gesture type; and generate an output that performs the action indicated by a signature gesture, corresponding to the first gesture type or a non-signature gesture, corresponding to the second gesture type.

8. The electronic device of claim 7, wherein the electronic device further comprises a neural network configured to classify the gesture.

9. The electronic device of claim 7, wherein:

the feature includes a time-velocity diagram (TVD) indicating a radial velocity between the radar transceiver and an object that is moving; and the processor is further configured to:

identify the TVD based on a maximum power, and classify the gesture using the TVD.

10. The electronic device of claim 7, wherein the processor is further configured to:

identify a distance from the radar transceiver to an object that is moving;

identify a Doppler shift range and an angle shift range of the angle shift;

compare the distance, the Doppler shift range and the angle shift range to respective thresholds; and based on the comparison of the distance, the Doppler shift range and the angle shift range to the respective thresholds, identify the gesture as the signature gesture or the invalid gesture.

11. A method for gesture recognition, the method comprising:

detecting a triggering event;

in response to detecting the triggering event, transmitting, via a radar transceiver, radar signals;

classifying a gesture from reflections of the radar signals received by the radar transceiver, wherein the gesture is classified as (i) a first gesture type when the gesture includes at least one repetition in a feature domain, (ii) a second gesture type when the gesture is not repeating in the feature domain, and (iii) an invalid gesture when the gesture is not classified as the first gesture type or the second gesture type;

when the gesture is not invalid identify the gesture based on a comparison of an angle shift to a first threshold and a power level change to a second threshold;

determining whether the gesture indicating a potential action is associated with the triggering event;

in response to determining that the gesture is associated with the triggering event, performing an action indicated by the gesture; and in response to determining that the gesture is not associated with the triggering event, not performing the action indicated by the gesture, wherein the feature domain includes at least one of Doppler, velocity, angle, and range.

12. The method of claim 11, further comprising:

identifying that the gesture is a signature gesture, the signature gesture corresponding to the first gesture type; and based on identifying that the gesture is the signature gesture and associated with the triggering event, performing the action indicated by the signature gesture, wherein the at least one repetition includes motion that is repeated in a similar direction or motion that is repeated in a reverse direction, and wherein the radar transceiver is a mono-static radar transceiver.

13. The method of claim 12, wherein after identifying that the signature gesture is not associated with the triggering event, the method comprises:

identifying one or multiple non-signature gestures based on reflections of the radar signals received by the radar transceiver, the non-signature gestures corresponding to the second gesture type; and performing different actions corresponding to the one or multiple non-signature gestures until a termination condition is detected.

14. The method of claim 11,

The gesture is a non-signature gesture that corresponds to the second gesture type; and the method further comprises:

identifying a signature gesture based on reflections of the radar signals received by the radar transceiver, before the non-signature gesture is identified, the signature gesture corresponding to the first gesture type, and based on identifying the signature gesture, determining to allow the non-signature gesture to perform the action on an electronic device.

15. The method of claim 14, wherein after identifying the signature gesture, the method comprises generating a notification indicating that the non-signature gesture performs the action on the electronic device.

16. The method of claim 11, wherein:

the gesture is a first signature gesture that corresponds to the first gesture type; and the method further comprises:

identifying, based on reflections of the radar signals received by the radar transceiver, a second signature gesture that does not correspond with any action for an electronic device to perform, the second signature gesture corresponding to the first gesture type, generating a notification indicating that a non-signature gesture controls the electronic device, the non-signature gesture corresponding to the second gesture type, identifying, based on reflections of the radar signals received by the radar transceiver, the non-signature gesture, and performing another action indicated by the non-signature gesture.

17. The method of claim 11, wherein identifying the gesture from the reflections, comprises:

extracting a feature from the reflections;

identifying, from the feature, movement associated with the gesture;

classifying the gesture based on the movement, by distinguishing the gesture between the invalid gesture and the first gesture type, or distinguishing the gesture between the invalid gesture and the second gesture type; and generating an output that performs the action indicated by a signature gesture, corresponding to the first gesture type, or a non-signature gesture, corresponding to the second gesture type.

18. The method of claim 17, wherein a neural network classifies the gesture.

19. The method of claim 17, wherein:

the feature includes a time-velocity diagram (TVD) indicating a radial velocity between the radar transceiver and an object that is moving; and the method comprises:

identifying the TVD based on a maximum power, and classifying the gesture using the TVD.

20. The method of claim 17, further comprising:

identifying a distance from the radar transceiver to an object that is moving;

identifying a Doppler shift range and an angle shift range of the angle shift;

comparing the distance, the Doppler shift range and the angle shift range to respective thresholds; and based on the comparison of the distance, the Doppler shift range and the angle shift range to the respective thresholds, identifying the gesture as the signature gesture or the invalid gesture.

* * * * *